US007962248B2

(12) United States Patent
Flohr

(10) Patent No.: US 7,962,248 B2
(45) Date of Patent: Jun. 14, 2011

(54) METHODS, SYSTEMS, CIRCUITS, AND COMPUTER PROGRAM PRODUCTS FOR REDUCING PEAK ELECTRICAL DEMAND BY SHIFTING ACTIVATION OF ELECTRICAL APPLIANCES

(76) Inventor: Daniel Flohr, Wilmington, NC (US)

( * ) Notice: Subject to any disclaimer, the term of this patent is extended or adjusted under 35 U.S.C. 154(b) by 0 days.

(21) Appl. No.: 12/692,991

(22) Filed: Jan. 25, 2010

(65) Prior Publication Data
US 2010/0125376 A1   May 20, 2010

Related U.S. Application Data

(63) Continuation of application No. 11/753,317, filed on Jun. 26, 2007, now Pat. No. 7,653,443.

(60) Provisional application No. 60/892,364, filed on Mar. 1, 2007.

(51) Int. Cl.
G05D 3/12        (2006.01)
G05D 5/00        (2006.01)
G05D 9/00        (2006.01)
G05D 11/00       (2006.01)
G05D 17/00       (2006.01)
G01R 21/00       (2006.01)
G01R 21/06       (2006.01)
G05F 1/70        (2006.01)
G05F 1/00        (2006.01)

(52) U.S. Cl. ........ 700/291; 700/286; 700/295; 700/297; 702/60; 702/61; 702/62; 323/212; 323/242; 323/246

(58) Field of Classification Search .......... 700/19, 700/22, 286, 291, 295, 297; 702/60–62; 323/212, 242, 246
See application file for complete search history.

(56) References Cited

U.S. PATENT DOCUMENTS

| 3,987,308 A | 10/1976 | Burch |
| 4,135,101 A | 1/1979 | Young et al. |
| 4,168,491 A * | 9/1979 | Phillips et al. ............ 340/501 |
| 4,208,593 A | 6/1980 | Sullivan |
| 4,283,635 A | 8/1981 | Balmer |
| 4,310,770 A | 1/1982 | Keener et al. |
| 4,360,881 A * | 11/1982 | Martinson ............ 700/298 |
| 4,509,128 A | 4/1985 | Coppola et al. |
| 4,659,943 A | 4/1987 | Virant |
| 4,731,547 A | 3/1988 | Alenduff et al. |
| 5,168,170 A | 12/1992 | Hartig |
| 5,311,068 A | 5/1994 | Miller |

(Continued)

OTHER PUBLICATIONS

Notification of Transmittal of the International Search Report and the Written Opinion of the International Searching Authority, or the Declaration, International Search Report, Written Opinion of the International Searching Authority, PCT/US08/02675, Filed Feb. 28, 2008.

(Continued)

*Primary Examiner* — Ramesh B Patel
(74) *Attorney, Agent, or Firm* — Myers Bigel Sibley & Sajovec, P.A.

(57) ABSTRACT

Methods of reducing peak electrical demand at a single customer location of an electrical service provider during at least one time interval during a day can include shifting the activation of a first electrical appliance located at the single customer location from the at least one time interval during a day to a second time interval during which a second electrical appliance is not activated for at least part of the second time interval. Related systems, circuits, and computer program products are disclosed.

7 Claims, 15 Drawing Sheets

U.S. PATENT DOCUMENTS

| | | | |
|---|---|---|---|
| 5,317,546 A | 5/1994 | Balch et al. | |
| 5,414,640 A | 5/1995 | Seem | |
| 5,454,114 A | 9/1995 | Yach et al. | |
| 5,461,266 A | 10/1995 | Koreeda et al. | |
| 5,485,491 A | 1/1996 | Salnick et al. | |
| 5,502,339 A | 3/1996 | Hartig | |
| 5,525,898 A | 6/1996 | Lee, Jr. et al. | |
| 5,543,667 A | 8/1996 | Shavit et al. | |
| 5,544,036 A | 8/1996 | Brown, Jr. et al. | |
| 5,572,438 A | 11/1996 | Ehlers et al. | |
| 5,578,753 A | 11/1996 | Weiss et al. | |
| 5,611,059 A | 3/1997 | Benton et al. | |
| 5,675,503 A | 10/1997 | Moe et al. | |
| 5,684,710 A | 11/1997 | Ehlers et al. | |
| 5,706,191 A | 1/1998 | Bassett et al. | |
| 5,761,083 A | 6/1998 | Brown, Jr. et al. | |
| 5,818,821 A | 10/1998 | Schurig | |
| 5,924,486 A | 7/1999 | Ehlers et al. | |
| 5,956,462 A | 9/1999 | Langford | |
| 5,968,393 A | 10/1999 | Demaline | |
| 5,999,888 A | 12/1999 | Aubee | |
| 6,061,604 A | 5/2000 | Russ et al. | |
| 6,067,482 A | 5/2000 | Shapiro | |
| 6,115,456 A | 9/2000 | Nolde | |
| 6,148,623 A | 11/2000 | Park et al. | |
| 6,208,806 B1 | 3/2001 | Langford | |
| 6,216,956 B1 | 4/2001 | Ehlers et al. | |
| 6,225,915 B1 | 5/2001 | Lobert | |
| 6,348,777 B1 | 2/2002 | Brown et al. | |
| 6,643,567 B2 | 11/2003 | Kolk et al. | |
| 6,653,933 B2 | 11/2003 | Raschke et al. | |
| 6,671,586 B2* | 12/2003 | Davis et al. | 700/295 |
| 6,693,999 B2 | 2/2004 | Ito et al. | |
| 6,792,321 B2 | 9/2004 | Sepe, Jr. | |
| 6,859,668 B1 | 2/2005 | Ginzburg et al. | |
| 6,861,621 B2 | 3/2005 | Ghent | |
| 6,879,059 B2 | 4/2005 | Sleva | |
| 6,924,727 B2 | 8/2005 | Nagaoka et al. | |
| 6,961,642 B2 | 11/2005 | Horst | |
| 6,962,162 B2* | 11/2005 | Acker | 137/1 |
| 7,032,018 B2 | 4/2006 | Lee et al. | |
| 7,130,719 B2 | 10/2006 | Ehlers et al. | |
| 7,206,670 B2* | 4/2007 | Pimputkar et al. | 700/291 |
| 7,333,880 B2 | 2/2008 | Brewster et al. | |
| 7,738,999 B2* | 6/2010 | Petite | 700/295 |
| 2002/0103655 A1* | 8/2002 | Boies et al. | 705/1 |
| 2003/0036810 A1* | 2/2003 | Petite | 700/9 |
| 2003/0225483 A1 | 12/2003 | Santinato et al. | |
| 2004/0153170 A1* | 8/2004 | Santacatterina et al. | 700/1 |
| 2004/0158620 A1 | 8/2004 | Ha et al. | |
| 2004/0249925 A1 | 12/2004 | Jeon et al. | |
| 2005/0022871 A1* | 2/2005 | Acker | 137/337 |
| 2005/0125083 A1 | 6/2005 | Kiko | |
| 2005/0131553 A1 | 6/2005 | Yoon et al. | |
| 2006/0080380 A1 | 4/2006 | Aizu et al. | |
| 2006/0133392 A1 | 6/2006 | Ajitomi et al. | |
| 2006/0147001 A1 | 7/2006 | Ha et al. | |
| 2006/0150120 A1 | 7/2006 | Dresti et al. | |
| 2007/0135973 A1* | 6/2007 | Petite | 700/295 |
| 2008/0177678 A1 | 7/2008 | Di Martini et al. | |
| 2008/0272934 A1* | 11/2008 | Wang et al. | 340/870.11 |

OTHER PUBLICATIONS

"Demand Profile for Madison Generation" Internet Energy Systems, Inc. Website. <http://www.internetenergysystems.com/IESWebSite/> 2 pages. Accessed May 22, 2007.

"In Search of Services" *Mechanical Engineering Power*. Website. <http://www.memagazine.org/supparch/mepower99/searchof/searchof.html> 5 pages. Accessed May 22, 2007.

"RFC 792—Internet Control Message Protocol." Website. <http://www.faqs.org/rfcs/rfc792.html> 15 pages. Accessed Apr. 14, 2004. Dated Sep. 1981.

"Understanding Electric Time-of-Use Billing" SDGE Customer Service, 2 pages (2002).

"Using Internet to Reduce Electricity Bills",*Rolland Piquepaille's Technology Trends*. Website. <http://www.primidi.com/2004/06/29.html> 2 pages. Accessed May 22, 2007. (Jun. 29, 2004).

Abras, et al. "A Multi-Agent Home Automation System for Power Management" ICINCO-ICSO 2006: Setúbal, Portugal. 6 pages.

Chen, Allan "Large Power Savings Found in Automated Demand Response Tests" Lawrence Berkeley national Laboratory, Environmental Energy Technologies Division. *Fall Newsletter*, vol. 6, No. 3. <http://eetdnews.lbl.gov/nl22/1pwr.htm> 3 pages. Accessed May 22, 2007.

Greene, Kate "Making the Power Grid Smarter" *Technology Review* <http://www.technologyreview.com/read_article/aspx?id=16843&ch=infotech> Accessed May 22, 2007. (May 12, 2006).

GridPoint™ <http://www.gridpoint.com> 2 pages. Accessed May 22, 2007.

GridWise™ Alliance <http://www.gridwise.org> 1 pages. Accessed May 22, 2007.

Invensys Network Systems "Products" website. <http://www.invensysnetworks.com/Products/default.asp> 2 pages. Accessed on Sep. 5, 2006.

Optimal Technologies "Automated Demand Response System and Advanced End-Use Services Platform." Presentation slides. 31 pages. (undated).

\* cited by examiner

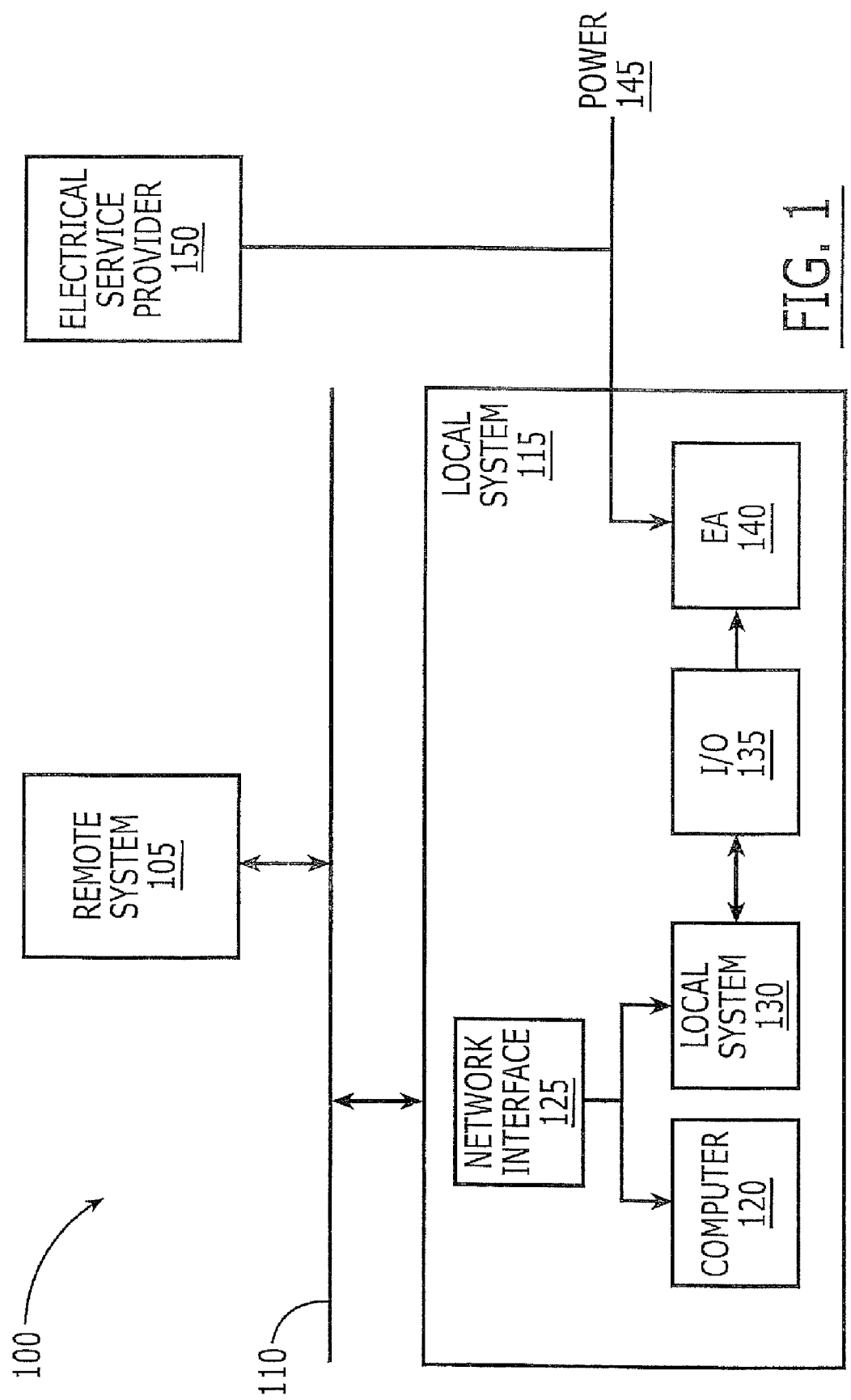

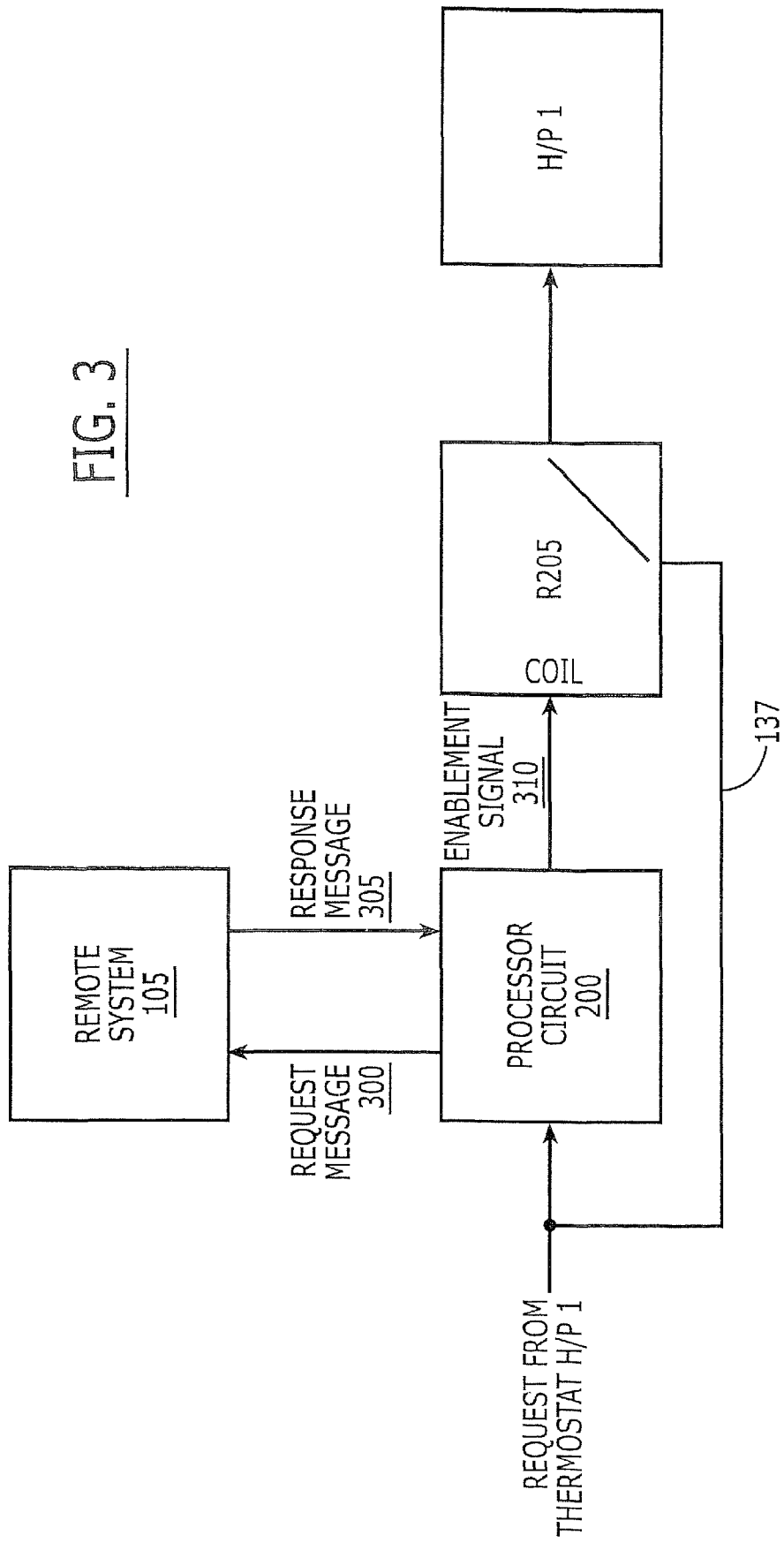

METHODS, SYSTEMS, CIRCUITS, AND COMPUTER PROGRAM PRODUCTS FOR REDUCING PEAK ELECTRICAL DEMAND BY SHIFTING ACTIVATION OF ELECTRICAL APPLIANCES

CROSS-REFERENCE TO RELATED APPLICATIONS

This application is a continuation of U.S. patent application Ser. No. 11/753,317, filed Jun. 26, 2007, entitled Methods, Systems, Circuits and Computer Program Products for Electrical Service Demand Management, which issued as U.S. Pat. No. 7,653,443 on Jan. 26, 2010, and which claims priority to U.S. patent application No. 60/892,364, filed Mar. 1, 2007, entitled Methods, Systems, Circuits and Computer Program Product for Electrical Service Demand Management, the entire contents of both of which are hereby incorporated herein by reference.

FIELD OF THE INVENTION

The invention relates to the field of electrical systems in general, and more particularly, to power systems management.

BACKGROUND

One problem faced by electrical service providers is the peak demand for electricity during certain time periods, such as during extremely hot or cold weather. Traditionally, electrical service providers meet this peak demand by purchasing expensive electricity from the power grid or, in extreme cases reduce service to entire neighborhoods or sectors of a grid, thereby totally eliminating or coarsely reducing the load.

Another approach is to reduce peak demand by eliminating or reducing the demand from some electrical appliances, such as heating units, air conditioners, and/or water heaters, while leaving other devices, such as lights and small appliances, operating normally. Some Electric providers offer programs where they can shut-off water heaters and air conditioners during peak periods. Such an approach, however, can be an inconvenience to some customers, especially if the offered financial incentives are small.

New approaches, such as real-time pricing for industrial customers, is another demand reducing technique where a financial penalty/reward system is offered to customers who can shift load to times where the elect provider can more easily supply it.

If these types of approaches are not effective, the electrical service provider may need to add additional power generation capacity by building new power plants even though the peak demand for power may exceed current capacity by only a small margin.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

In some embodiments according to the invention, reducing peak electrical demand at a single customer location of an electrical service provider during at least one time interval during a day can be provided by, for example, shifting the activation of a first electrical appliance located at the single customer location from the at least one time interval during a day to a second time interval during which a second electrical appliance is not activated for at least part of the second time interval, wherein said shifting comprises operations performed using a programmed computer processor circuit. In other embodiments, shifting the activation of the first electrical appliance is based on a determination of the effects of the simultaneous activation of the first and second electrical appliances, and is further based on a determination of the effects of the subsequent deactivation of the first and second electrical appliances.

In further embodiments, shifting the activation of the first electrical appliance is determined by a demand management server remote from the single customer location and communicatively coupled, via a network, with the single customer location. In still other embodiments, a user interface to the demand management server is provided at the single customer location, and input is provided to the demand management server via the user interface. The input includes user preferences used by the demand management server to customize the shifting of the activation of the first electrical appliance. In yet other embodiments, the input further includes a comfort level specified for the single customer location indicating the user's desired level of environmental comfort at the single customer location. The specified comfort level corresponds to the degree of overlapping activation time of the first and second electrical appliances allowed by the demand management server (e.g., the higher the comfort level specified, the higher a degree of overlapping activation time is allowed by the demand management server).

In other embodiments, shifting the activation of the first electrical appliance further includes determining a first priority associated with activation of the first electrical appliance; determining a second priority associated with activation of the second electrical appliance; and shifting the activation of the first electrical appliance based on a comparison of the first priority and the second priority, such that the appliance with the lower priority is not activated until the appliance with the higher priority is not active. In some embodiments, the first electrical appliance is a water heater.

Other embodiments according to the invention provide a method of controlling activation of electrical appliances. The method includes reducing overlapping activation time of different electrical appliances located at a single customer location of an electrical service provider during at least one time interval during a day, wherein said reducing comprises operations performed using a programmed computer processor circuit.

Still other embodiments according to the invention provide a method of controlling electrical appliances used at a customer location, including receiving input indicating environmental parameters associated with use of first and second electrical appliances at the customer location; asserting a first enable signal, associated with operation of the first electrical appliance, during a first time interval to allow the first electrical appliance to activate to affect at least one of the environmental parameters; de-asserting the first enable signal before a start of a second time interval immediately subsequent to the first time interval; and asserting a second enable signal, associated with operation of the second electrical appliance, during the second time interval to allow the second electrical appliance to activate to affect at least another of the environmental parameters. The said receiving, asserting a first enable signal, de-asserting a first enable signal, and asserting a second enable signal steps comprise operations performed using a programmed computer processor circuit.

Embodiments have been described herein primarily with respect to methods for reducing peak electrical demand at a single customer location of an electrical service provider during at least one time interval during a day and/or controlling electrical appliances. However, analogous computer systems and computer program products may also be provided according to other embodiments.

BRIEF DESCRIPTION OF THE DRAWINGS

FIG. 1 is a block diagram that illustrates embodiments of systems for demand management in some embodiments according to the invention.

FIG. 3 is a block diagram that illustrates message traffic between a local system processor circuit and a remote system in response to requests to enable/disable the respective electrical appliances by coupling/decoupling power thereto in some embodiments according to the invention.

DESCRIPTION OF EMBODIMENTS ACCORDING TO THE INVENTION

Figure 2A:
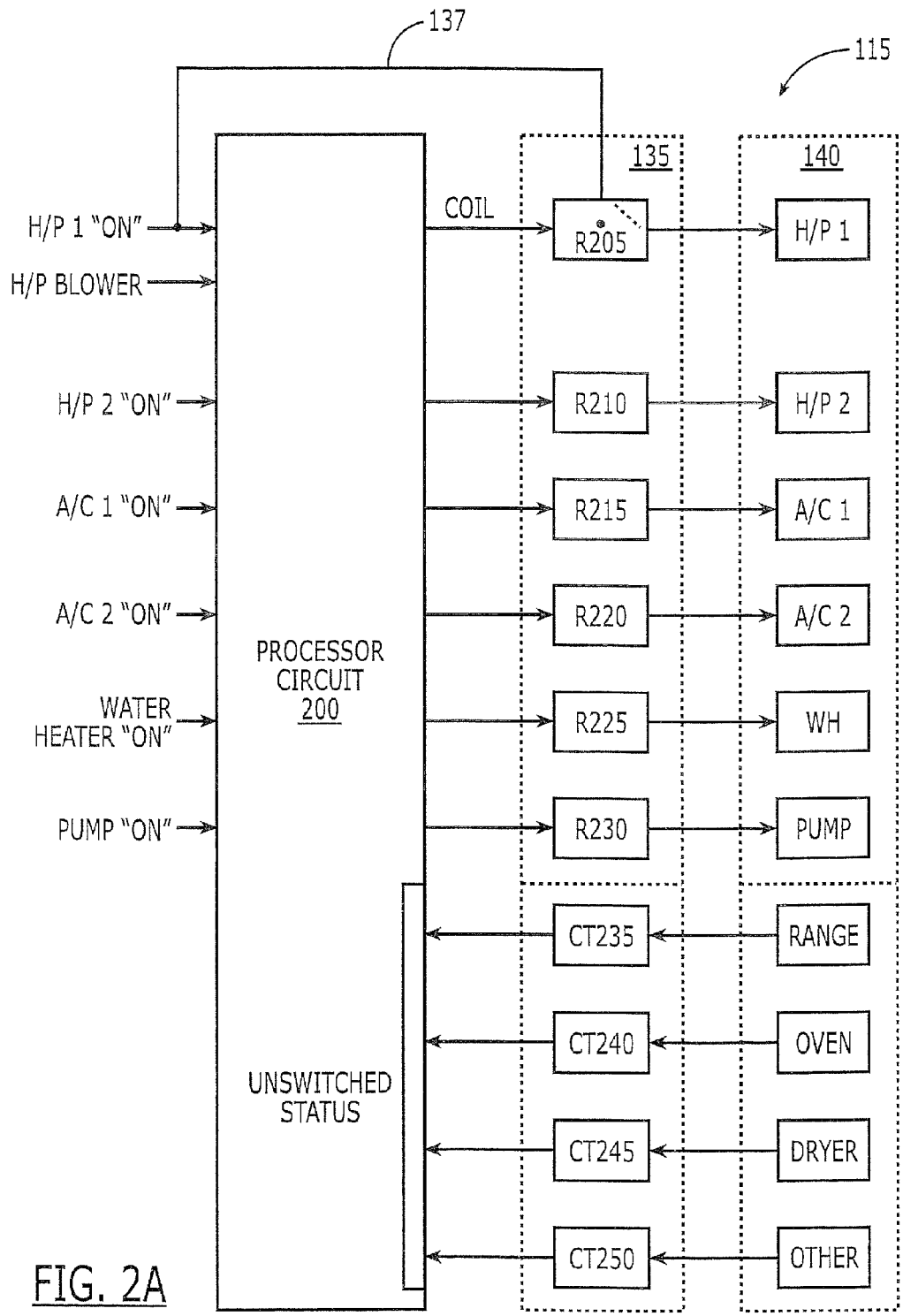
FIG. 2A is a block diagram that illustrates a local system processor circuit providing enable signals to an input/output circuit used to enable/disable electrical appliances in some embodiments according to the invention.

The invention now will be described more fully hereinafter with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The invention is also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller or other processor, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present invention is not TCP/IP-specific or Internet-specific. The present invention may be embodied using various protocols over various types of computer networks.

It is understood that each block of the illustrations, and combinations of blocks in the illustrations can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Embodiments according to the invention can operate in a logically separated (or physically separated) client side/server side-computing environment, sometimes referred to hereinafter as a client/server environment. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated.

Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server under the control of a user. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. A SOAP client can be used to request web services programmatically by a program in lieu of a web browser.

The applications provided by the service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

The clients and servers can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

As appreciated by the present inventor, the systems described herein can be utilized according to a time-of-use billing system to allow a reduction in demand for electrical service at a customer location. In particular, time-of-use billing systems have been adopted by electrical service providers to encourage customers to shift usage of electrical appliances to "off peak" times. Off peak usage of electrical appliances can be advantageous to electrical service providers as it may reduce the need for the electrical service provider to increase peak power production by, for example, adding capacity to their power generation grid.

As appreciated by those skilled in the art, electrical service providers may not typically store electricity generated at one time for use at a later time. Accordingly, one of the issues faced by electrical service providers is to provide electrical service that can meet the peak demand requirements of the grid that the electrical service provider supplies.

Therefore, in some embodiments according to the invention, the systems, circuits, computer program products, and methods described herein can be used to time shift or otherwise control different electrical appliances to reduce overlapping activation and operating times of those different electrical appliances during a time interval, which is monitored by the electrical service provider for billing under the time-of-use billing arrangement. More specifically, in a time-of-use billing arrangement, the electrical service provider will measure the maximum amount of power used during pre-determined time intervals, such as 15 minute intervals, over a specified period for which the customer is billed (e.g., a month).

Therefore, as appreciated by the present inventor, significant reductions in demand during these time intervals may be achieved by reducing the overlapping activation time of different electrical appliances that are located at a single customer location. For example, in some embodiments according to the invention, two electrical appliances (such as two different heat pumps at a single customer location) can be controlled so that the activation of each of the respective heat pumps is shifted with respect to one another. Accordingly, time shifting the activation of the different heat pumps can reduce the likelihood that both heat pumps are active during the same on-peak time intervals, where the electrical service provider measures the maximum demand for electrical service for the purposes of billing.

These approaches may provide both a cost reduction for the customer as well as the benefit to the electrical service provider by allowing a further reduction in the peak demand capacity required for the grid. In particular, the electrical service provider may further reduce the peak capacity of their power generation as both heat pumps are less likely to be activated at the same time (i.e., during peak demand).

As described hereinbelow in greater detail, reducing the overlapping activation time of different electrical appliances at a single customer location can be provided by, for example, time shifting the activation of the different electrical appliances into different time intervals by manipulating the activation of one or more of the electrical appliances to shift the operation thereof to a time interval when other electrical appliances are disabled. For example, in some embodiments according to the invention, two heat pumps can be run simultaneously (during off peak hours) to determine the rate at which each of the respective heat pumps heats the corresponding living space at the single customer location. The rate at which those respective living spaces cool after the heat pumps are disabled can also be determined. These rates of heating/cooling can be used to determine a time at which one of the heat pumps can be prematurely deactivated so that by the time the respective living space cools to a point where it should be reheated, the other heat pump has heated the other living sufficiently and will switch off. Therefore, the two heat pumps can operate during two different time intervals (with reduced overlapping activation times).

In still other embodiments according to the invention, the heat pumps described above can be controlled to be active during different time intervals by providing respective enablement signals to allow the coupling/decoupling of power to the heat pumps. For example, in some embodiments according to the invention, both heat pumps may request activation, but only one may be enabled for activation (such as the higher priority heat pump) while the other heat pump waits until the higher priority heat pump is allowed to heat the respective living space adequately. Subsequently, the second heat pump can be enabled for activation while the higher priority heat pump is disabled.

In other embodiments according to the invention, the systems, methods, and computer program products described herein can be provided as part of a distributed system including a remote system and a local system (at the single customer location). Accordingly, the local system can receive requests from the different electrical appliances at the single customer location and transmit messages to the remote system via a network. The remote system can respond to the request messages with response messages either granting or denying the requests made by the respective electrical appliances.

The local system can receive the response messages and provide enablement signals to an input/output circuit which can control the coupling/decoupling of power to the respective electrical appliances. For example, in some embodiments according to the invention, a thermostat controlling a heat pump may signal the local system that the living space to which the heat pump is coupled should be heated. The local system can respond by transmitting a message to a remote system which can determine whether the request from the heat pump should be fulfilled while reducing overlapping activation time of different electrical appliances (such as other heat pumps or water heaters located at the same customer location which may be currently on or may later request activation).

If the remote system determines that the request from the heat pump should be fulfilled, the remote system can transmit a response message to the local system indicating that the local system should enable the heat pump for activation. Upon receiving the response message, the local system can assert an enablement signal to an input/output circuit associated with the heat pump. The enablement signal can control the respective input/output circuit to couple electrical power from the electrical service provider to the heat pump. Accordingly, the determinations of which electrical appliances should be enabled for activation and which electrical appliances should be disabled for activation can be determined by the remote system.

FIG. 1 is a block diagram that illustrates local and remote systems for reducing overlapping activation times of different electrical appliances at a single customer location in some embodiments according to the invention. As shown in FIG. 1, a system 100 can include both a local system 115 and a remote system 105, which can communicate with one another over a network 110. It will be understood that the network 110 can be any type of communications network that allows messaging between the local system 115 and the remote system 105. For example, the network 110 can be the Internet, an Intranet, a public switched telephone network, or a wireless communications network. The network 110 can also be a combination of these components.

The remote system 105 can provide a demand management server which can make determinations of when different electrical appliances located at the single customer location should be enabled/disabled to reduce overlapping activation times. In particular, the demand management server can make the determinations of which electrical appliances are to be enabled/disabled based on, for example, messages received from the local system 115, that indicate which electrical appliances are requesting activation.

The demand management sever can be controlled by a user (such as the customer associated with a single customer location) via an interface so that the user can customize the controls provided to the demand management server to reduce the overlapping activation times. For example, the demand management server can allow the user to specify a comfort level for the single customer location where a higher comfort level allows the demand management server to increase overlapping activation times to increase the relative comfort of the environment at the single customer location. In contrast, a lower comfort setting can indicate that the demand management server can be more aggressive by further reducing the overlapping activation times to make the environment relatively less comfortable in the interest of allowing reductions in the cost of the electrical service provided to the single customer location.

It will be understood that the interface to the demand management server can be accessed via a computer 120 associated with the single customer location. It will be understood that the computer 120 can be any computer whether located at the single customer location or remote therefrom. For example, the computer 120 can actually be a computer system located in a different city than the single customer location so that the user can adjust the settings used by the demand management server while the customer is traveling for an extended period of time. Alternatively, the computer 120 can be located at the single customer location. In still other embodiments according to the invention, the computer 120 can actually be a system which is less capable than a general purpose computer system, such as a telephone, or other electronic device which can still provide an interface to the demand management server.

As further shown in FIG. 1, the computer 120 can access the network 110 through a network interface circuit 125 (such as a router/cable modem) typically provided by a broadband service to allow access for the computer 120 to the Internet. In other words, in some embodiments according to the invention, the communication between the local system 115 and the remote system 105 (as well as the computer 120) can be provided by a standard broadband connection to the Internet.

As further shown in FIG. 1, the local system 115 includes a local processor circuit 130 connected to the network interface circuit 125 and an input/output (I/O) circuit 135. The local processor circuit 130 can operate to receive requests from electrical appliances requesting activation. For example, the local processor circuit 130 can receive signals from thermostats associated with heat pumps, air conditioners, etc. that would otherwise activate the respective electrical appliances without any further intervention. However, in some embodiments according to the invention, the request from the respective electrical appliance is provided to the local processor circuit 130. The local processor circuit 130 can then formulate messages for transmission to the remote system 105 via the network 110 indicating that the respective electrical appliance is requesting activation.

If the remote system 105 determines that the requesting electrical appliance is to be enabled for activation, a response message 105 can be transmitted to the local processor circuit 130, whereupon the local processor circuit 130 can assert an enablement signal to the input/output circuit 135 to couple electrical power 145 provided by an electrical service provider 150 to an electrical appliance 140.

It will be understood that the electrical service provider can be an electric utility company which owns and operates large scale power generating plants for delivery to the power grid to which the single customer location is connected. However, it will be understood that the electrical service provider 150 can be any entity that provides electrical service to the single customer location and is not necessarily limited to those entities that own and operate electrical power generation facilities.

It will be further understood that although the determinations described herein to reduce the overlapping activation of different electrical appliances located at a single customer location are described as being made the demand management server at the remote system 105, in some embodiments according to the invention, some or part of the determinations can be made by the local system 115. For example, in some embodiments according to the invention, the local system 115 can operate independent of the remote system 105 when the local system 115 is unable to communicate with the remote system 105. For example, during periods when the network 110 is out of operation, the local system 115 may operate the electrical appliances 140 based on a simple set of rules that are stored locally for access by the local processor circuit 130.

In some embodiments according to the invention, the local processor circuit 130 may access a nonvolatile memory system that stores instructions for the local processor circuit 130 which, when executed by the local processor circuit 130, provide relatively simple control of the electrical appliances 140, which may still reduce overlapping activation times. For example, the local processor circuit 130 may enable the different electrical appliances on a round robin basis in different time intervals until the local system 115 is able to re-establish communication with the remote system 105.

It will be also understood that the term "electrical appliance" as used herein refers to any electrical appliance that can demand a substantial amount of electrical power for operation. For example, an electrical appliance can include an electric heat pump, an electric air conditioner, an electric water heater, an electric pump and/or an electrical appliance that includes a pump, such as a pump used to operate a pool or spa. These types of electrical appliances are also sometimes referred to herein as "switched" electrical appliances.

The electrical appliance can also include a transient electrical appliance that demands a substantial amount of electrical power for operation, such as an electric range, an electric oven, an electric clothes dryer and/or an electric fan or blower, any of which are sometimes referred to herein as un-switched electrical appliances. It will be further understood that any combination of these electrical appliances can be included at the single customer location and controlled by the local system 115.

FIG. 2A is a block diagram that illustrates a local processor circuit 200 coupled to the input/output circuit 135 and electrical appliances 140 shown in FIG. 1, in some embodiments according to the invention. According to FIG. 2A, the processor circuit 200 receives requests from the switched electrical appliances (such as heat pumps, air conditions, water heaters, etc.) which indicate that the respective electrical appliance should be switched on responsive to some environmental parameter. For example, the environmental parameter can be an indication from a thermostat associated with a heat pump signaling that the measured temperature in the associated living space has reached a lower limit and, therefore, the heat pump should be activated to begin heating the living space. In some embodiments according to the invention, the processor circuit 200 can be an MC9S12NE64 microprocessor marketed by FreeScale® of Austin, Tex., which includes onboard memory (such as RAM, ROM, flash, etc.), I/O circuits, analog to digital converters, as well as a physical and/or wireless connection to an Ethernet network.

According to FIG. 2A, each of the switched electrical appliances can have an associated request provided to the processor circuit 200, where each indicates a request for activation from, for example, a thermostat associated with the respective electrical appliance. It will be understood that these switched request inputs from the electrical appliances can be provided to the processor circuit 200 directly or indirectly, including wired or wireless transmission, to an analog to digital converter circuit (not shown). Alternatively, the analog to digital converter circuit can be included in the processor circuit 200 itself, such as at an input stage of the processor circuit 200.

The processor circuit 200 is also coupled to relays (R205, R210, R215, R220, R225, and R230) via respective enablement signals corresponding to each of the requests received from the electrical appliances. For example, the processor circuit 200 provides an enablement signal to relay R205 that is used to enable/disable the activation of heat pump 1. The enablement signal provided to the relay R205 can cause the contacts of the relay R205 to be configured to couple a request (H/P 1 "ON" 137) from thermostat to the heat pump. Similarly, each of the remaining relays is also provided with a respective enablement signal from the processor circuit 200 that is intended to control the respective electrical appliance which provided the associated request. Accordingly, each of the electrical appliances having a thermostat associated therewith can be activated/deactivated responsive to a corresponding relay providing the activation/deactivation signal from the associated thermostat. Accordingly, although not shown explicitly in FIG. 2A, each of the relays coupled to the switched electrical appliances can provide an associated request from the corresponding thermostat controlling the switched electrical appliance.

In some alternative embodiments according to the invention, the relays R205-230 are provided with electrical power 145, which can be coupled/decoupled to the respective electrical appliance responsive to the corresponding enablement signal from the processor circuit 200. For example, electrical power 145 can be coupled to the heat pump 1 responsive to an enablement signal to the relay R205 responsive to a request from a thermostat associated with heat pump 1 provided to the processor circuit 200. It will be understood that the enablement signals provided by the processor circuit 200 can undergo a digital to analog conversion before being provided to the respective relays R205-230 so that the processor circuit 200 can provide adequate control.

Figure 2B:
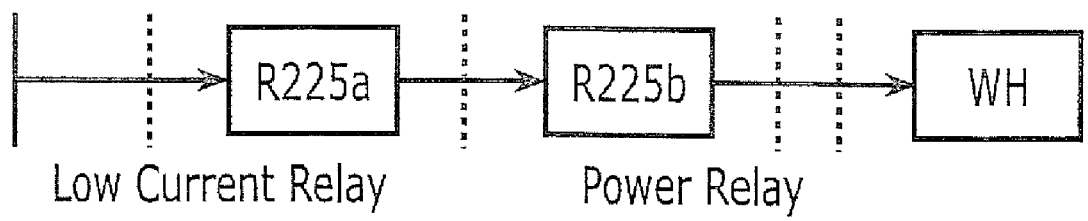
FIG. 2B any is a block diagram that illustrates the relay circuits shown in FIG. 2A. including a low current relay and a power relay in some embodiments according to the invention.

Moreover, relays which control relatively high power electrical appliances (such as a water heaters), can include a low current relay configured to drive a high power relay as shown, for example, in FIG. 2B. As shown in FIG. 2B, the relay 225 configured to couple/decouple power to the water heater can include a low current relay 225*a* that is connected in series with a higher power relay 225*b,* which in-turn is configured to couple/decouple power to/from the water heater.

It will further be understood that the relays R205-230 can be configured to remain in a closed position in the absence of any input from the processor circuit 200. For example, if the processor circuit 200 goes off-line, fails, or is otherwise unable to communicate with the remote system 105 so that no determinations can be provided regarding which electrical appliances are to be enabled/disabled, the relays 205-230 can remain in a state that statically couples the power 145 to each of the electrical appliances. Accordingly, continuous electrical service may be provided to the single customer location uninterrupted despite the suspension of the determination to reduce overlapping activation times of the different electrical appliances.

It will further be understood that the relays 205-230 can refer to two or more relays coupled together to facilitate the control of the processor circuit 200 over the switched electrical appliances, as shown in FIG. 2B. For example, the relays can actually refer to a power relay that is suitable for coupling/decoupling of substantial amounts of current to/from the electrical appliance connected to a relatively lower power relay that is more suited for operation by the processor circuit 200.

It will further be understood that although each of the switched inputs provided to the processor circuit 200 are illustrated as being the same, each of the inputs may call for separate signal conditioning based on, for example, the voltage levels over which the respective signal operates. For example, the request from the water heater may operate over relatively high voltage levels due to the nature of the switches integrated into the hot water heater for the operation thereof. Accordingly, the request from the hot water heater may undergo conditioning so that the voltage levels provided to the processor circuit 200 are adequate. Furthermore, the switched requests from the electrical appliances may be optically coupled to the processor circuit 200 to provide adequate isolation between the electrical appliance and the processor circuit 200.

The processor circuit 200 also receives inputs from transient un-switched electrical appliances, such as an electric range, an electric oven, an electric dryer, and/or an electric blower or fan. The inputs from these un-switched electrical appliances can take the form of signals indicating that the respective electrical appliance is in operation. For example, the processor circuit 200 can receive a signal indicating that an electric range has been switched on, which is provided via a current transformer 235. Similarly, each of the other un-switched electrical appliances can be associated with a respective current transformer 240, 245, and 250, each of which provide an indication to the processor circuit 200 that the respective un-switched electrical appliance is in operation.

The processor circuit 200 can use these indications of un-switched electrical appliance activation as the basis of messages to the remote system 105. In accordance, the remote system 105 may respond to the message from the processor circuit 200 that an un-switched electrical appliances is currently in operation by transmitting a response message to the processor circuit 200 indicating that one or more of the switched electrical appliances should be disabled.

It will further be understood that the inputs provided from the current transformers 235-250 can undergo signal conditioning (such as analog to digital conversion) as described above in reference to the requests from the switched electrical appliances. In some embodiments according to the invention, the analog to digital conversion for the inputs provided by the current transformers may be different than the analog to digital conversion provided for the inputs from the switched electrical appliances.

FIG. 3 is a block diagram that illustrates processing of messages by the demand management server/remote system 105 and the processor circuit 200 located at the single customer location in response to requests from electrical appliances in some embodiments according to the invention. According to FIG. 3, the processor circuit 200 receives a request from a thermostat associated with a heat pump 1 indicating that an environmental parameter (e.g., temperature) has reached a lower operating level so that the living space should be heated by heat pump 1.

In some embodiments according to the invention, the processor circuit 200 formulates a message request 300 to the remote system 105 including a payload that indicates which electrical appliance (i.e., heat pump 1) has requested activation. It will be understood that the payload of the request message 300 can include additional information beyond the identity of the electrical appliance requesting activation.

If the remote system 105 determines that heat pump 1 should be activated, the response system 105 transmits a response message 305 to the processor circuit 200. Upon receipt of the response message 305, the processor circuit 200 asserts an enablement signal 310 to the relay R205 that couples the request from the thermostat to heat pump 1. It will be further understood that the remote system 105 can subsequently determine that heat pump 1 should be deactivated whereupon a response message 305 is sent to the processor circuit 200 indicating that the enablement signal 310 should be deactivated. In response, the relay R205 is reset so that the request from the thermostat is decoupled from the heat pump 1. In still other embodiments according to the invention, the response message 305 that caused the heat pump 1 to be activated can also include an indication of when the heat pump should be disabled by the processor circuit 200, to thereby reduce the need for additional messages.

The demand management server can control the different electrical appliances based on the nature of the specific electrical appliance requesting activation as well as general rules regarding off-peak and on-peak time intervals. For example, the demand management sever can operate so that during off peak time intervals, little or no effort can be made to reduce overlapping activation times as the demand during off-peak hours may not be critical to electrical service providers and, moreover, is not used to determine maximum power usage for time of use billing.

During on-peak time intervals, the demand management server may operate each of the electrical appliances differently during each of the time intervals. For example, during on-peak time intervals, the demand management server may operate water heaters with a default setting that such heaters are only enabled for activation when no other electrical appliances are active. In some embodiments according to the invention, the demand management server can operate so that electric water heaters are enabled for activation for only a portion of every time interval, and further, can be enabled for activation based on what other electrical appliances are currently enabled. For example, the electric hot water heater may be assigned a relatively low priority so that other electrical appliances will be enabled for activation before the electric hot water heater.

The demand management server/remote system 105 can operate heat pumps and air conditioners according to a prioritization scheme during on-peak intervals so that certain living spaces known to be used more during the peak time intervals have priority over other living areas. For example, the living area of a house including the bedrooms may have lower priority during peak hours during colder months of the year as these rooms are typically not used significantly during the peak time intervals. In some embodiments according to the invention, the demand management server can control the maximum amount of time that heat pumps and air conditioners are allowed to run during any time interval. For example, the demand management server may limit the maximum run time to one-half of a time interval. Furthermore, in some embodiments according to the invention, the demand management server can operate the heat pumps and/or air conditioners so that a minimum time between enablement or activations is observed. For example, the demand management server may operate heat pumps/air conditioners so that the high priority living space is provided with service more frequently than less important living spaces. In still other embodiments according to the invention, the demand management server may toggle the priority of the living spaces or assign the priority in a round-robin type scheduling.

Referring to FIGS. 2 and 3, the demand management server can monitor operations of the electrical appliances to collect performance data. The performance data may be used to provide service notices to, for example, the customer. For example, the demand management server can monitor a heat pump's air handling blower fan's operation (on/off time etc.) to notify the customer that air filters may need to be changed. In particular, the blower fan can be monitored by tapping the corresponding thermostat wire that provides an indication to the processor circuit 200 regarding the operation of the blower. Accordingly, the processor circuit 200 can monitor the periodic operation of the blower and formulate request messages 300 to the remote system 105 which indicates the usage of the blower. Such information may be used by the remote system to signal when periodic maintenance should be provided to the system in which the blower is included.

In still further embodiments according to the invention, the demand management server can monitor requests from particular electrical appliances to determine whether the respective electrical appliance is operating as expected. For example, the remote system 105 may determine that heat pump 1 is experiencing potential problems due to either the number of request messages 300 requesting activation of heat pump 1 or the duration that the heat pump is running during uncontrolled off peak hours is different then expected. The remote system 105 may determine that (based, for example, on the number of times that heat pump 1 has been cycled to date) that heat pump 1 may require service. The remote system 105 may also determine that heat pump 1 may require service based on the time needed to heat the associated living space with reference to an outside temperature. Alternatively, the remote system 105 may determine that the heat pump 1 is likely experiencing some undiagnosed problem such as a leak which may affect the efficiency of heat pump 1.

In still further embodiments according to the invention, the demand management server may monitor the time elapsed between a request for activation and the time at which the request from heat pump 1 is removed. In particular, the demand management server may determine historic data regarding the performance of heat pump 1. For example, the demand management server may collect historic data that indicates that heat pump 1 has, on average, taken an approximate amount of time to heat the associated living space to a desired temperature. Over time, the demand management server may further determine that the time between the initiation of a request from heat pump 1 and the removal of the request from heat pump 1 has increased (indicating that the upper temperature limit associated with the thermostat has been reached) thereby indicating that heat pump 1 may be experiencing a loss in efficiency due to the increased time needed to heat the living space to the desired upper temperature limit. Although the operations described above reference the operation of a heat pump and a blower, it will be understood that similar types of monitoring may be provided for other electrical appliances such as air conditioners, hot water heaters, pumps, etc.

In some embodiments according to the invention, messages between the local and remote systems can be structured according to any format that allows the transmission thereof over the network(s) described herein. For example, the message format can be that of an ICMP message, which is described in the RFC 792 specification located on the Internet at, e.g., the Internet RFC Index section of the Internet FAQ Archives website (faq.org). The disclosure of RFC 792 is hereby incorporated herein by reference in its entirety. Other message structures, such as UDP, TCP/IP, IGMP, ARP, and RARP, can also be used.

The messages may also be transmitted wirelessly using, for example, Short Message Service (SMS) or Enhanced Message Service (EMS) formatted messages, Multimedia Message Service (MMS), and/or Smartmessaging™ formatted messages. As is known to those skilled in the art, SMS and EMS messages can be transmitted on digital networks, such as GSM networks, allowing relatively small text messages (for example, 160 characters in size) to be sent and received via the network operator's message center to the mobile device 20, or from the Internet, using a so-called SMS (or EMS) "gateway" website. Accordingly, if either the local or remote system is off-line, the SMS messages (or commands) can be stored by the network, and delivered later when the respective system is on-line again.

MMS is a messaging system for asynchronous messaging, which is based on the SMS standard, but which enables communication of messages containing "rich media" content, i.e., content of types that tend to be more data-intensive than text. MMS is standardized by the WAP Forum and the Third-Generation Partnership Project (3GPP) and is described in: "WAP MMS, Architecture Overview," WAP-205, WAP Forum (Approved Version Apr. 25, 2001); "WAP MMS, Client Transactions Specification," WAP-206, WAP Forum (Approved Version Jan. 15, 2002); "WAP MMS, Encapsulation Specification," WAP-209, WAP Forum (Approved Version Jan. 5, 2002); "Requirements", 3GPP specification 22.140; and "Architecture and Functionality," 3GPP specification 23.140.

Figures 4, 5:
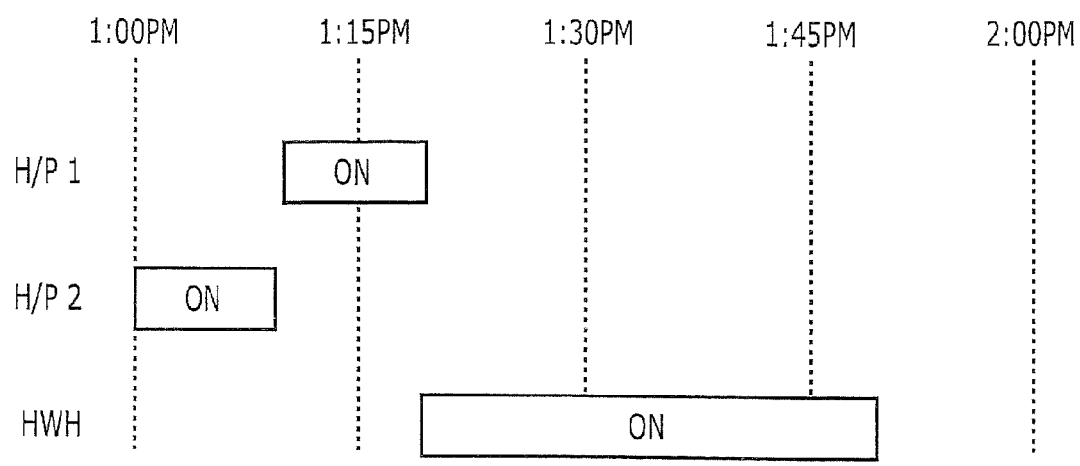
FIG. 4 is a table that illustrates state information related to the current status and previous status of selected electrical appliances in some embodiments according to the invention.
FIG. 5 is a timeline illustrating enablement/disablement of respective electrical appliances in some embodiments according to the invention.

FIG. 4 is a table that illustrates status information that may be maintained by the demand management server for use in determining whether enablement of a particular appliance should be provided by the processor circuit 200. In particular, the demand management server can record which of the electrical appliances is currently on and which of the electrical appliances was previously on during the current time interval. For example, the demand management server can monitor request messages from the processor circuit 200 to determine that heat pump 1 is currently on but has not previously been on during the current time interval. Furthermore, messages from the processor circuit 200 can indicate that heat pump 1 is not currently on but was previously on during the current time interval. Similar data can be recorded for the other electrical appliances.

FIG. 5 is a timeline that illustrates activation of electrical appliances located at the single customer location so as to reduce overlapping activation times thereof during time intervals of the day. According to FIG. 5, heat pump 2 (H/P 2) is enabled for activation at approximately 1:00 p.m. and disabled for activation at about 1:10 p.m. Subsequent to the disablement of heat pump 2, heat pump 1 (H/P 1) is enabled for activation until about 1:20, whereupon heat pump 1 is disabled. Subsequent to the disablement of heat pump 1, the hot water heater (WH) is enabled for activation through approximately 1:50 p.m. Therefore, as shown in FIG. 5, the electrical appliances HP1, HP2, and WH are enabled for activation during different time intervals so as to reduce the overlapping activation time thereof.

It will be understood that the time interval as defined in FIG. 5 includes any time interval for which one of the electrical appliances is enabled for activation. For example, the time interval for H/P2 is the time between 1:00 p.m. and 1:10 p.m., whereas the time interval for H/P1 is about 1:10 p.m. to about 1:20 p.m. Accordingly, none of the electrical appliances is activated during overlapping time intervals, which may allow a reduction in the demand associated with the single customer location serviced by the electrical service provider.

Figure 6:
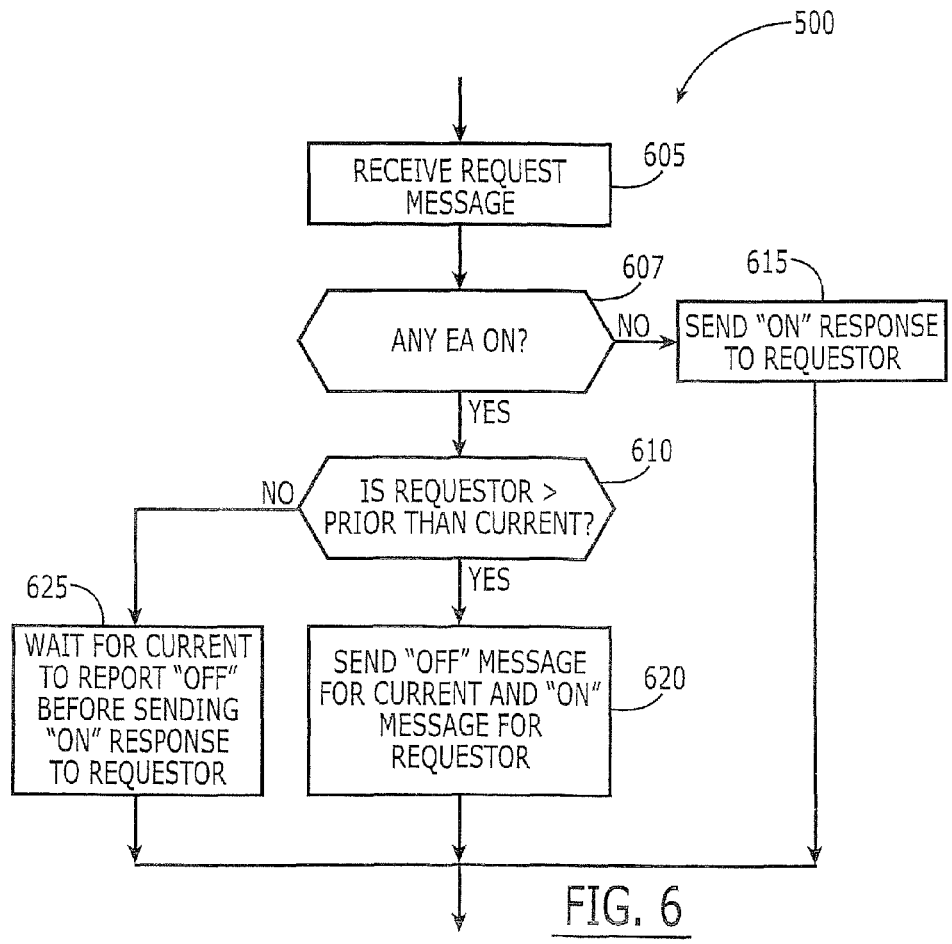
FIG. 6 is a flowchart that illustrates operations of local and remote systems according to the timeline illustrated in FIG. 5 in some embodiments according to the invention.

FIG. 6 is a flowchart that illustrates operations of local and remote systems according to the timeline illustrated in FIG. 5 in some embodiments according to the invention. Referring to FIGS. 3-6, a request from an electrical appliance (EA) is received at the processor circuit 200, whereupon the processor circuit 200 transmits a request message 300 to the demand management server (block 605). The demand management server accesses the table shown in FIG. 4 to determine if any of the appliances are currently enabled at the single customer location (block 607). If no electrical appliances are currently enabled for activation at the single customer location (block 607), the remote system 105 transmits a response message 305 indicating that the processor circuit 200 is to enable the requesting electrical appliance for activation by asserting the enablement signal 310 (block 615), and then returns to a state awaiting a new request from an electrical appliance.

If, however, at least one of the other electrical appliances at the single customer location is currently enabled for activation at the single customer location (block 607), the demand management server determines if the requesting electrical appliance has a greater priority than the electrical appliance that is currently enabled for activation (block 610). If the requesting electrical appliance has a lower priority than the currently enabled electrical appliance (block 610), the demand management server waits for the currently enabled electrical appliance to report an off status before sending a response message 305 indicating that the requesting electrical appliance is to be enabled by the processor circuit 200 (block 625), whereupon the demand management server returns to a state awaiting a new request.

If, however, the requesting electrical appliance does have a higher priority than the currently enabled electrical appliance (block 610), the remote system 105 transmits a response message 305 indicating that the currently enabled electrical appliance is to be disabled by the processor circuit 200. Furthermore, the remote system 105 transmits a response message 305 indicating that the processor circuit 200 is to enable the requesting electrical appliance having the higher priority (block 620), whereupon the demand management server returns to a state awaiting a new request.

It will be understood that although the demand management server is described above as sending separate response messages 305 indicating first an off for the currently enabled electrical appliance and a second message indicating enablement of the higher priority requesting electrical appliance, both commands may be included in a single response message in some embodiments according to the invention.

Figure 7:
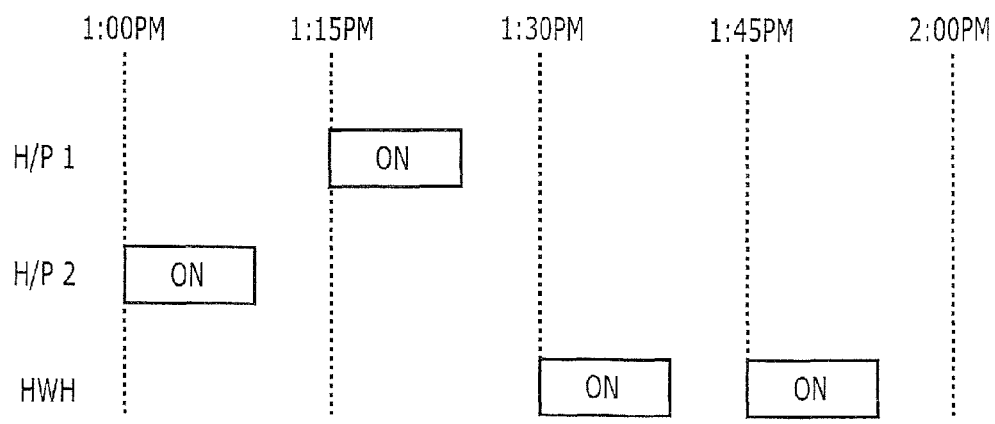
FIG. 7 is a timeline that illustrates enablement/disablement of respective electrical appliances during different time intervals in some embodiments according to the invention.

FIG. 7 is a timeline that illustrates enablement for activation of electrical appliances during different time intervals defined by the electrical service provider in some embodiments according to the invention. According to FIG. 7, electrical appliance H/P 2 is enabled for activation at a time interval beginning at 1:00 p.m. At some time during the first time interval beginning at 1:00 p.m., the electrical appliance H/P 2 is deactivated after reaching an upper operational limit (e.g. upper temperature setting of a thermostat).

As shown in FIG. 7, during the latter part of the first time interval after the deactivation of electrical appliance H/P 2, no other electrical appliances are enabled for activation during that time interval. At the start of the second time interval at about 1:15 p.m., electrical appliance H/P 1 is enabled for activation. Subsequently, during the same time interval beginning at 1:15 p.m., the electrical appliance H/P 1 is deactivated. During a later portion of the second time interval, no other electrical appliance is activated for the remainder of that time interval. As further shown in FIG. 7, the electrical appliance WH is enabled for activation during the third time interval at around 1:30 p.m., and later deactivated during the same time interval. No electrical appliance is activated during the third time interval after the deactivation of the electrical appliance WH. During a fourth time interval beginning at around 1:45 p.m., the electrical appliance WH is again enabled for activation during the subsequent time interval, and is deactivated during the same fourth time interval prior to the end thereof. Accordingly, as shown in FIG. 7, the activation of the different electrical appliances can be controlled so that only one electrical appliance is on during a single time interval.

Although the time interval described in reference to FIG. 7 is defined as 15 minutes, the time interval can be defined by the electrical service provider to be any predetermined time. Moreover, the time interval is defined by the electrical service provider to coincide with the periods during which the electrical service provider measures the maximum amount of power used for the purposes of billing under the time-of-use billing system described herein. Accordingly, the operations shown in FIG. 7 can allow the reduction of overlapping activation times of the different electrical appliances by synchronizing the activation times to the predetermined time intervals defined by the electrical service provider.

Figure 8:
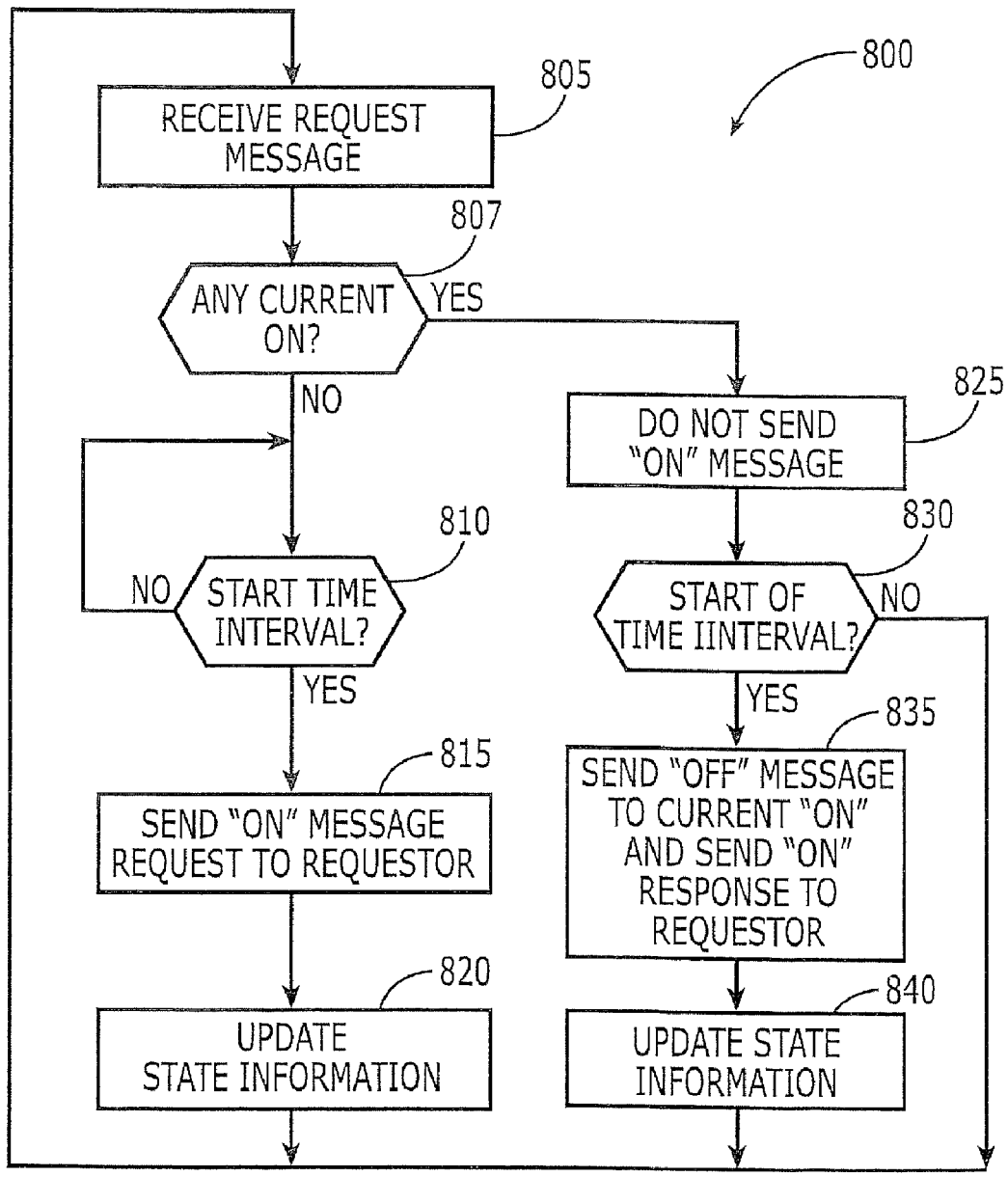
FIG. 8 is a flowchart that illustrates operations of local and remote systems according to the timeline illustrated in FIG. 7 in some embodiments according to the invention.

FIG. 8 is a flowchart that illustrates operations of the systems described herein in accordance with the timeline shown in FIG. 7 in some embodiments according to the invention. According to FIG. 8, a request for activation is received from an electrical appliance and the processor circuit 200 forwards a request message 300 to the remote system 105 (block 805). The demand management server determines if any electrical appliance is currently enabled for activation at the single customer location (block 807). If the demand management server determines that no other electrical appliance is currently enabled for activation (block 807), the demand management server further determines whether the start of a predetermined time interval defined by the electrical service provider has been reached (block 810). If the demand management server determines that the start of the time interval has not been reached (block 810), the demand management server withholds the transmission of response messages until the start of the next time interval.

If however, the demand management server determines that the next time interval has started (block 810), the demand management server sends a response message 305 indicating that the requesting electrical appliance is to be enabled for activation through the processor circuit 200 assertion of the enablement signal 310 (block 815). The demand management server further updates the state table shown in FIG. 4 indicating that the requesting electrical appliance has been enabled for activation at the single customer location (block 820), and returns to a state awaiting another request.

If, however, the demand management server determines that another electrical appliance is currently enabled for activation at the single customer location (block 807), the demand management server withholds a response message 305 indicating that the requesting electrical appliance is to be enabled (block 825). It will be understood that, in some embodiments according to the invention, a response message 305 may be sent, however, the response message 305 may simply be an indication that the request was received while not indicating that the requesting electrical appliance is to be enabled. If the demand management server determines that the start of the next time interval has begun (block 830), a response message 305 is transmitted to the processor circuit 200 indicating that the requesting electrical appliance is to be enabled for activation.

Furthermore, the demand management server transmits a message indicating that the currently on electrical appliance is to be disabled (block 835). The demand management server further updates the state table shown in FIG. 4 to indicate that the currently on electrical appliance has now been disabled and that the requesting electrical appliance has been enabled for activation (block 840). The demand management server then returns to a state awaiting another request for activation.

Figure 9:
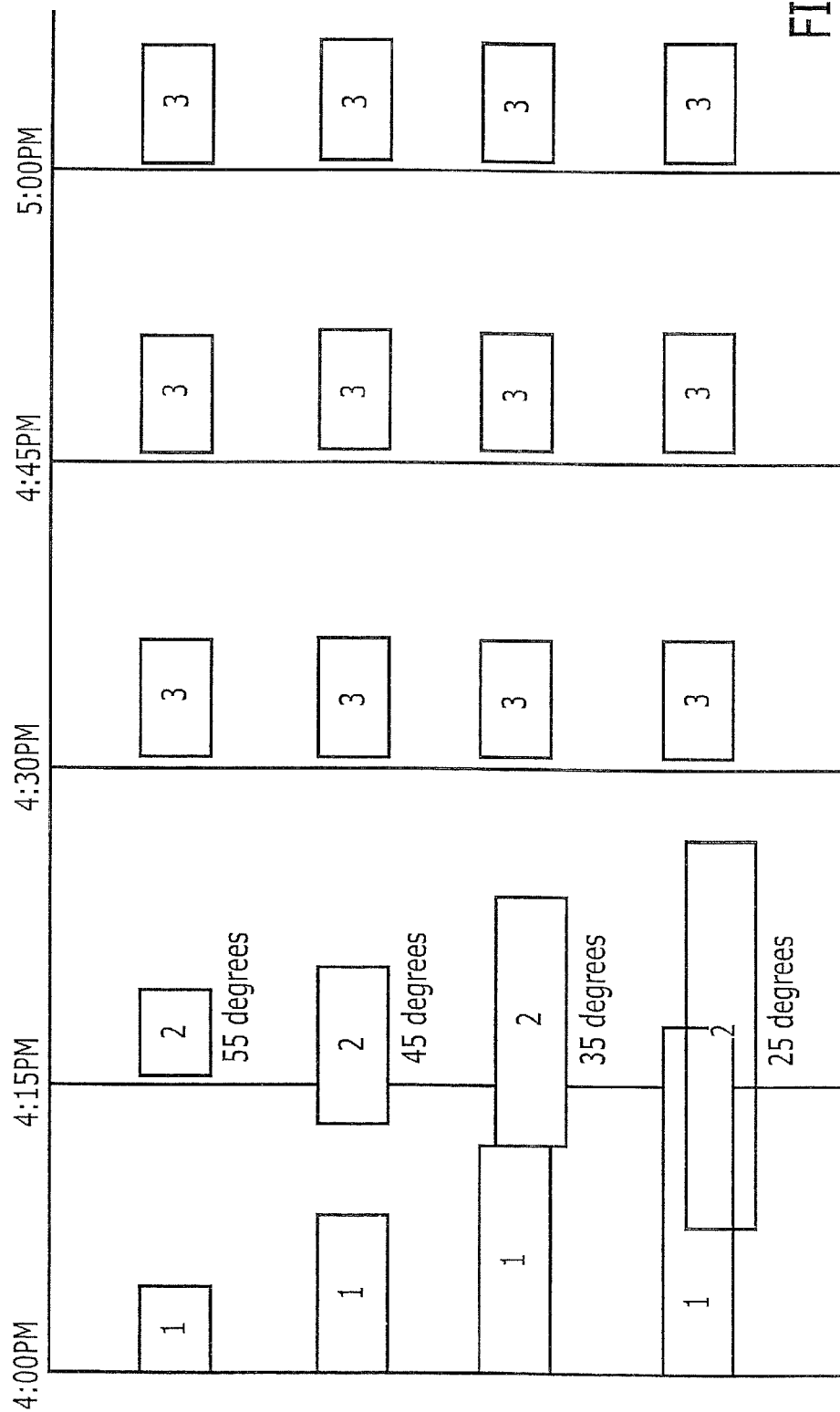
FIG. 9 is a timeline that illustrates enablement/disablement of respective electrical appliances as a function of environmental factors in some embodiments according to the invention.

FIG. 9 is a timeline that illustrates variation in the enablement for activation of electrical appliances in different time intervals and within the same time interval including overlapping times in response to variations in outside temperature in some embodiments according to the invention. According to FIG. 9, when the temperature outside is relatively mild (i.e. 55 degrees), an electrical appliance (such as heat pumps and hot water heaters) can operate as described above in reference to FIGS. 7 and 8 where different electrical appliances are enabled for activation during different time intervals to reduce overlapping activation times.

However, as further shown in FIG. 9, as the outside temperature begins to drop, it may be more difficult to maintain a suitable comfort level inside the single customer location so that some of the electrical appliances may be enabled for activation during a later portion of the same time interval in which another electrical appliance was enabled. For example, as shown in FIG. 9, when the outside temperature decreases to 45 degrees, the second heat pump (2) may be enabled for activation during the first time interval when the first heat pump is also enabled. Although the first and second heat pumps can be enabled during the same time interval, the demand management server may enable the different heat pumps so as to reduce the overlapping activation times by advancing the activation time of the second heat pump from the beginning of the second time interval. In other words, the demand management server can advance the time at which the second heat pump would otherwise be enabled into the first time interval, but also avoid concurrent activation of the second heat pump with the first heat pump.

As further shown in FIG. 9, when the outside temperature is further reduced to 35 degrees, the second heat pump may be activated within the first time interval immediately adjacent to the time at which the first heat pump is disabled. Again, the activation of the second heat pump can be advanced from the start of the second time interval (where the second heat pump would otherwise be enabled) to maintain the comfort level at the single customer location.

When the outside temperature drops to 25 degrees, the first and second heat pumps may operate concurrently during the first time interval, but may still have reduced overlapping activation times as the first heat pump may operate from the start of the first time interval, whereas the second heat pump may activate during the later portion of the first time interval so as to still reduce the overlapping activation time despite the need to increased heating due to the lower outside temperature.

FIG. 9 also shows the periodic enablement for activation of the hot water heater during the third and fourth time intervals between 4:30 pm and 5:00 pm as well as the first interval after 5 pm. Accordingly, the time shifting of the enablement for activation of the hot water heater allows for a reduction in the overlapping activation time with either the first or second heat pumps. In other words, the demand management server may still reduce overlapping activation time of the hot water heater by recognizing the increased need for the heat pumps to possibly run concurrently and, therefore, time-shift the operation of the hot water heater to other time intervals.

Figure 10:
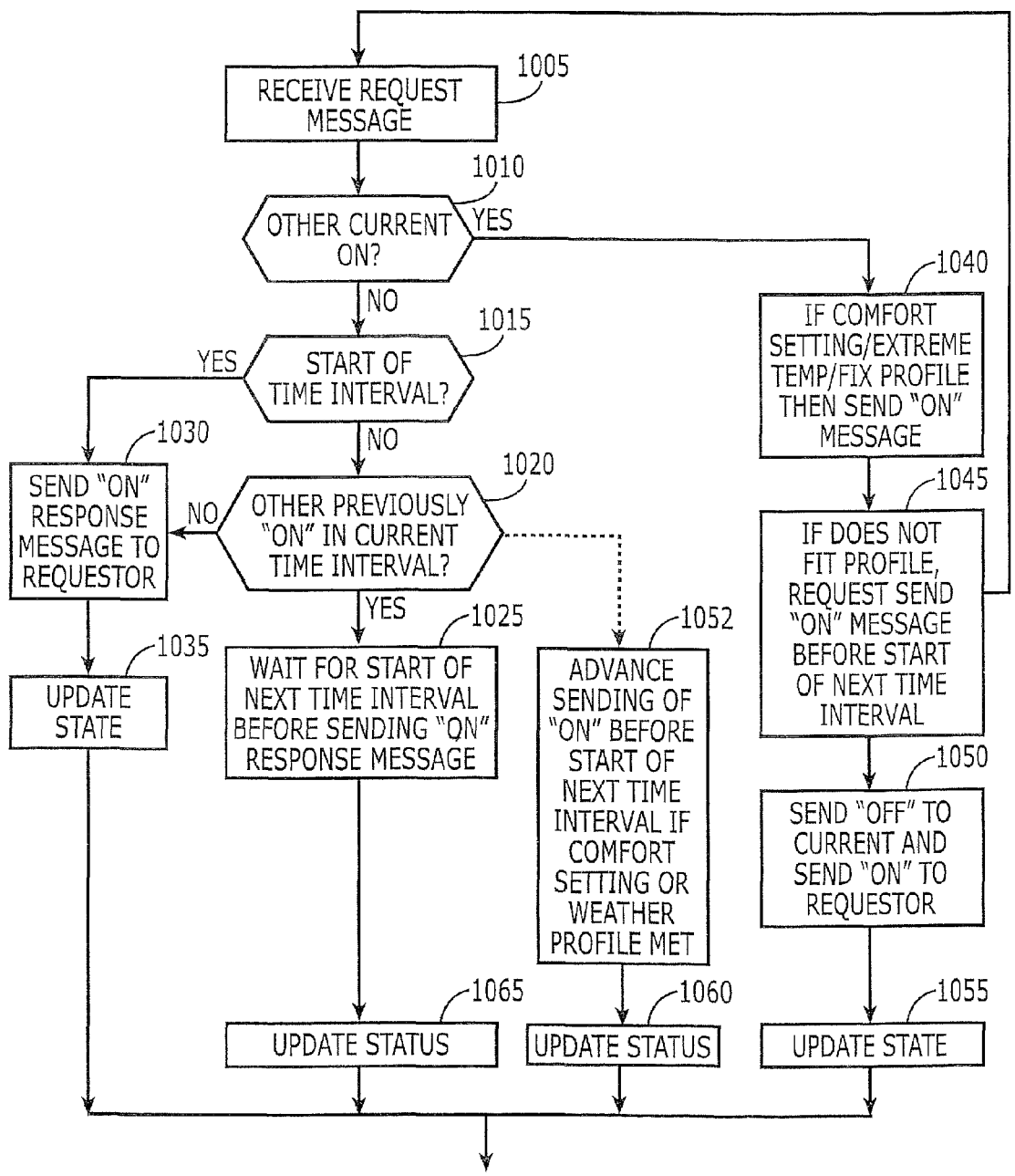
FIG. 10 is a flowchart that illustrates operations of local and remote systems according to the timeline illustrated in FIG. 9 in some embodiments according to the invention.

FIG. 10 is a flow chart that illustrates operations of the systems described herein in accordance with the timeline shown in FIG. 9 in some embodiments according to the invention. According to FIG. 10, an electrical appliance provides a request to the processor circuit 200 for activation, which forwards a request message 300 to the remote system 105 (Block 1005). The demand management server determines if any other electrical appliances are currently enabled for activation (Block 1010). If no other electrical appliances are enabled for activation (Block 1010) the demand management server determines whether the start of a time interval has begun (Block 1015). If the demand management server determines that a time interval has begun (Block 1015), the remote system 105 sends a response message 305 indicating that the requesting electrical appliance should be enabled by the processor circuit 200 (Block 1030). The remote system 105 then updates the status table shown in FIG. 4 to reflect that the requesting electrical appliance has been activated during the current time interval (Block 1035), and returns to a state awaiting the receipt of another request for activation.

If, however, the demand management server determines that a new time interval has not begun (Block 1015), the demand management server determines whether other electrical appliances were previously enabled for activation in the current time interval (Block 1020). If other electrical appliances were not enabled for activation during the current time interval, the remote system 105 sends a response message 305 to the processor circuit 200 indicating that the requesting electrical appliance should be enabled for activation (Block 1030), and then proceeds according to Blocks 1030 and 1035.

If, however, the demand management server determines that other electrical appliances were previously enabled during the current time interval (Block 1020), the demand management server waits for the start of the next time interval before sending a response message 305 indicating to the processor circuit 200 that the electrical appliance requesting activation be enabled (Block 1025). The demand management server then updates the status table shown in FIG. 4 to reflect that the requesting electrical appliance is now enabled for activation during the current time interval, and returns to a state awaiting the next request for activation (Block 1065).

Alternatively, upon determining that other electrical appliances have previously been enabled for activation in the current time interval (Block 1020), the remote system 105 can send a response message 305 to the processor circuit 200 indicating that the enablement for activation of the requesting appliance should be advanced into the current time interval, and should not be withheld until the start of the next time interval when, for example, the comfort settings or current weather associated with the single customer residence meet the profile associated with increased activation indicating that additional activations may be required, such as when the outside temperature is particularly low (Block 1052). The remote system 105 then updates the information included in the status table shown in FIG. 4 (Block 1060), and returns to a state of waiting for the next request for activation.

If, however, the demand management server determines that other electrical appliances are currently enabled for activation in the current time interval (Block 1010) the demand management server sends a response message 305 activating a second electrical appliance if the comfort settings, or temperature, etc. fit the profile associated with increased activation (Block 1040), such as when the external temperature is such that additional heating may be required. If, however, the demand management server determines that the current conditions do not warrant additional activation, the demand management server does not send a response message 305 activating the requesting electrical appliance until the start of the next time interval (Block 1045).

The demand management server can also send a response message 305 indicating that the processor circuit 200 should disable the currently activated electrical appliance and indicating that the requesting electrical appliance should be enabled for activation (Block 1050). The demand management server then updates the information in the status table shown in FIG. 4, and returns to a state of waiting a next request for activation.

Figure 11:
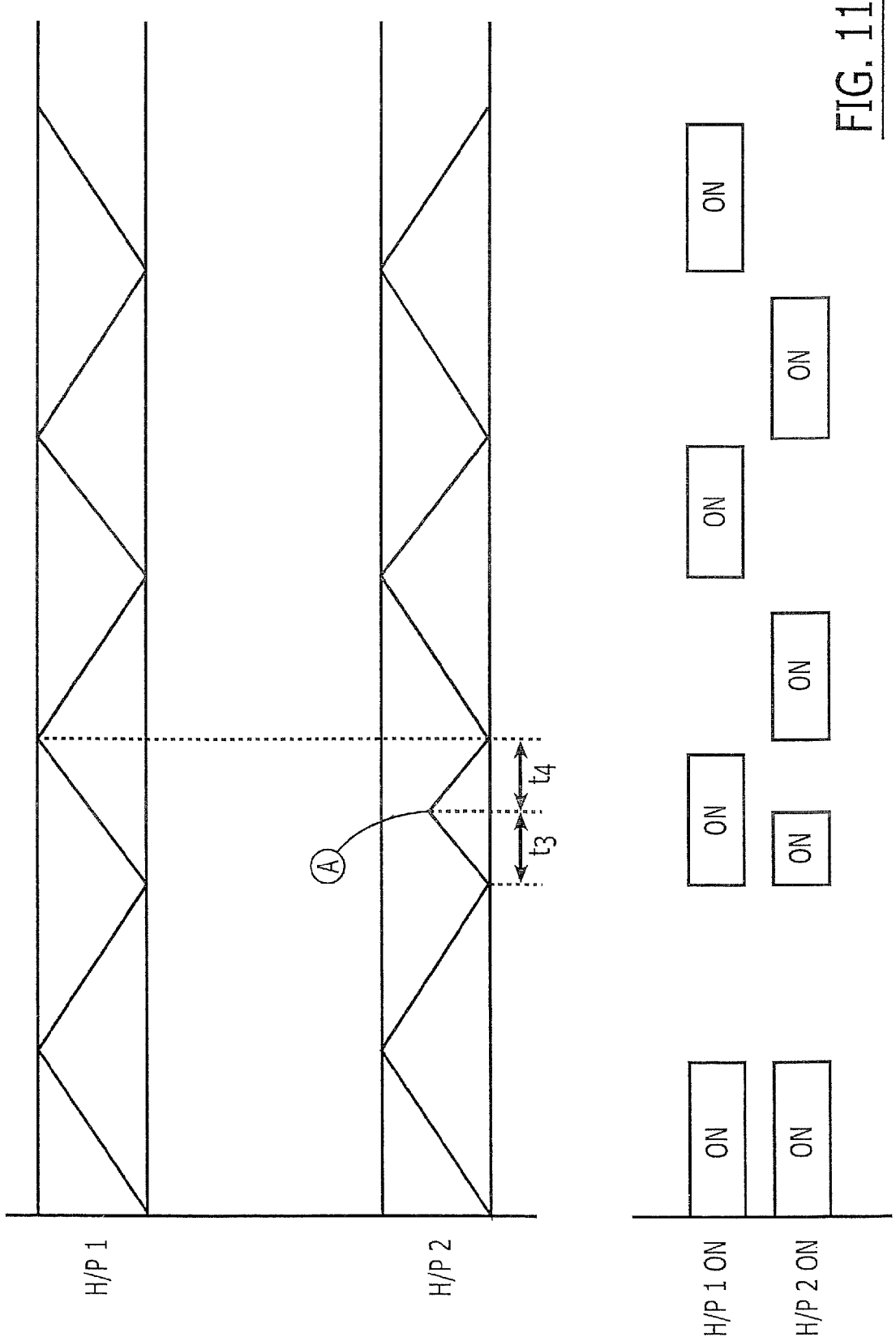
FIG. 11 is a timeline showing enablement/disablement of respective electrical appliances time-shifted into different time intervals in some embodiments according to the invention.

FIG. 11 is a timeline illustrating time shifting the activation of different electrical appliances into different time intervals during the day to reduce overlapping activation times in some embodiments according to the invention. In particular, FIG. 11 shows active and inactive time intervals for two respective heat pumps H/P1 and H/P2. During an initial phase (i.e., off-peak), H/P1 and H/P2 can both operate concurrently so that both heat pumps heat the respective living spaces simultaneously. During this off-peak interval, heating and cooling rates can be determined for the heat pump, which is to be time shifted relative to the other. For example, in FIG. 11 heat pump 2 is time-shifted relative to the operation of heat pump 1.

Both heat pump 1 and heat pump 2 operate by starting from an initial level in heating the respective living space to respective operational limits. Once the operational limit of heat pump is reached, the respective heat pump is inactivated through the operation of the thermostat. Accordingly, the off-peak interval can be used to determine respective heating and cooling rates for each of the heat pumps operating to heat the respective living space.

As further shown in FIG. 11, heat pump 2 can be time shifted to operate out of phase with respect to heat pump 1 by determining a deactivation time t3 for heat pump 2 to provide an initial time shift interval, after which heat pump 2 will be allowed to be activated while heat pump 1 is concurrently deactivated. In particular, the deactivation time t3 can be determined by estimating the amount of time needed for the respective living space heated by heat pump 2 to cool to the initial level at about the time that heat pump 1 is projected to reach the operational limit and become inactive. For example, if the projected time at which heat pump 1 is projected to become inactive is t3, the initial time shift interval can be provided by deactivating heat pump 2 in advance of the projected deactivation time for heat pump 1 based on the estimated rate of cooling of the living space associated with heat pump 2 upon reaching a temperature A.

Once the temperature of the living space heated by HP2 reaches temperature A, the heat pump 2 can be deactivated so that the living space starts to cool at a rate that is estimated during the off-peak interval. During the same time, heat pump 1 continues to heat the respective living space until reaching the projected time at which heat pump 2 will become inactive. At about the same time, the living space associated with heat pump 2 should have returned to the initial level after cooling in response to the deactivation of heat pump 2 during the initial time shift interval at time t3. Once heat pump 2 is reactivated and heat pump 1 is deactivated at time t4, both heat pump 1 and heat pump 2 can operate out of phase with each other. Moreover, the operation of heat pump 1 and heat pump 2 can occur without the imposition of control signals by the processor circuit 200. In other words, once the operation of the heat pump 1 and heat pump 2 are time shifted with respect to one another, the operation of the respective heat pumps may be allowed to continue uninterrupted while still remaining out of phase with one another. This out of phase operation can allow a reduction in overlapping activation time of heat pumps at the single customer location to provide a reduction and a maximum amount of power monitored by the electrical service provided in a time of use billing arrangement thereby leading to both a reduction in the peak power that need be generated by the electrical service provider as well as a reduction in the demand at the single customer location.

Figure 12:
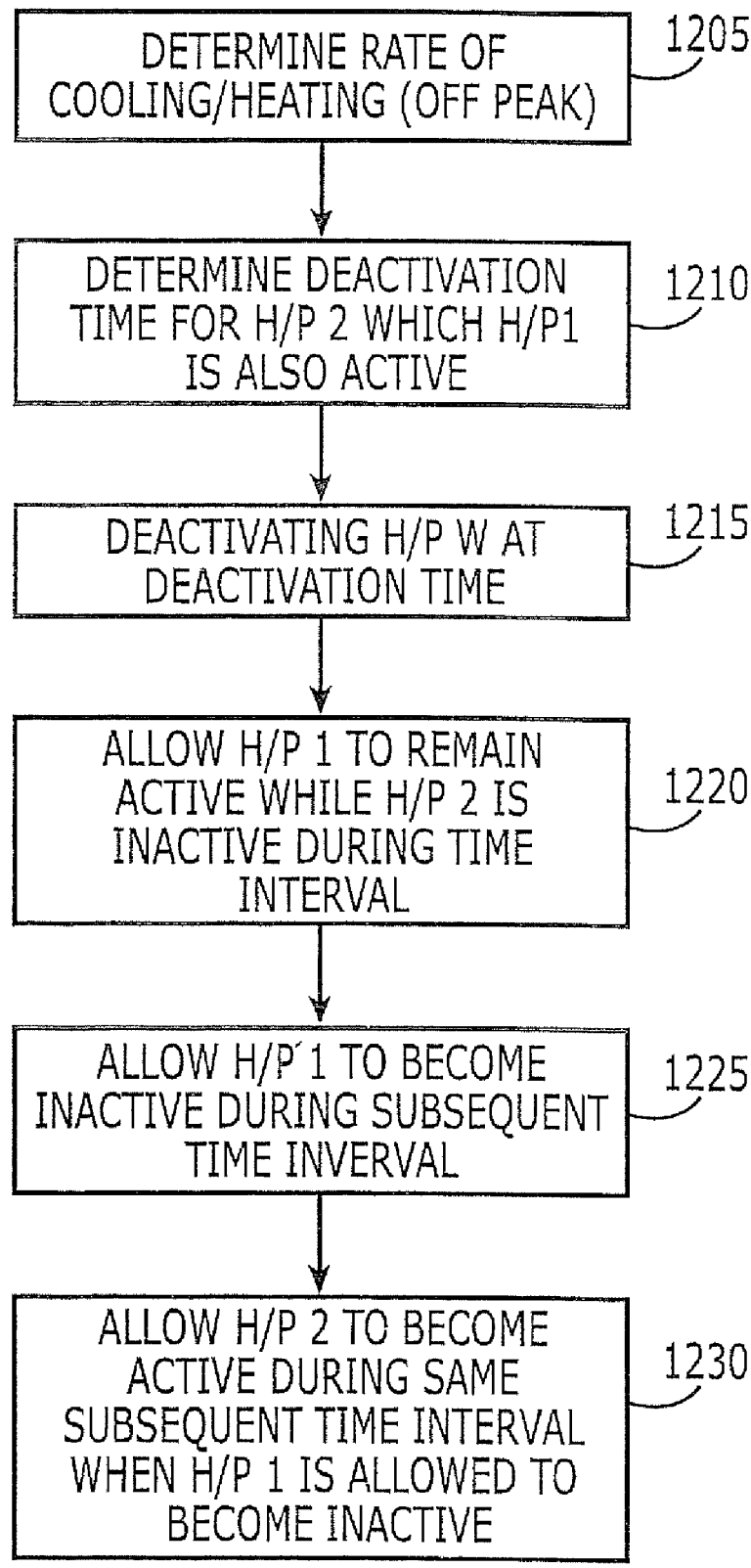
FIG. 12 is a flowchart that illustrates operations of local and remote systems according to the timeline illustrated in FIG. 11 in some embodiments according to the invention.

FIG. 12 is a flow chart that illustrates operations of heat pump 1 and heat pump 2 according to the timeline shown in FIG. 11 in some embodiments according to the invention. According to FIG. 12, a determination is made during off-peak operation of the rate of cooling and/or heating associated with the respective heat pump HP1/HP2 (Block 1205). A determination is then made of deactivation time for H/P 2 when H/P1 is also active to provide an initial time shift interval (Block 1210).

Heat pump 2 is disabled at the determined deactivation time while heat pump 1 continues activation (Block 1215). Heat pump 1 is allowed to remain active while HP2 remains inactive during the initial time shift interval (Block 1220). HP1 is allowed to become inactive during the subsequent time interval that projected time (Block 1225) and HP2 allowed to become active during the same time interval when HP1 is inactive (Block 1230).

Figure 13:
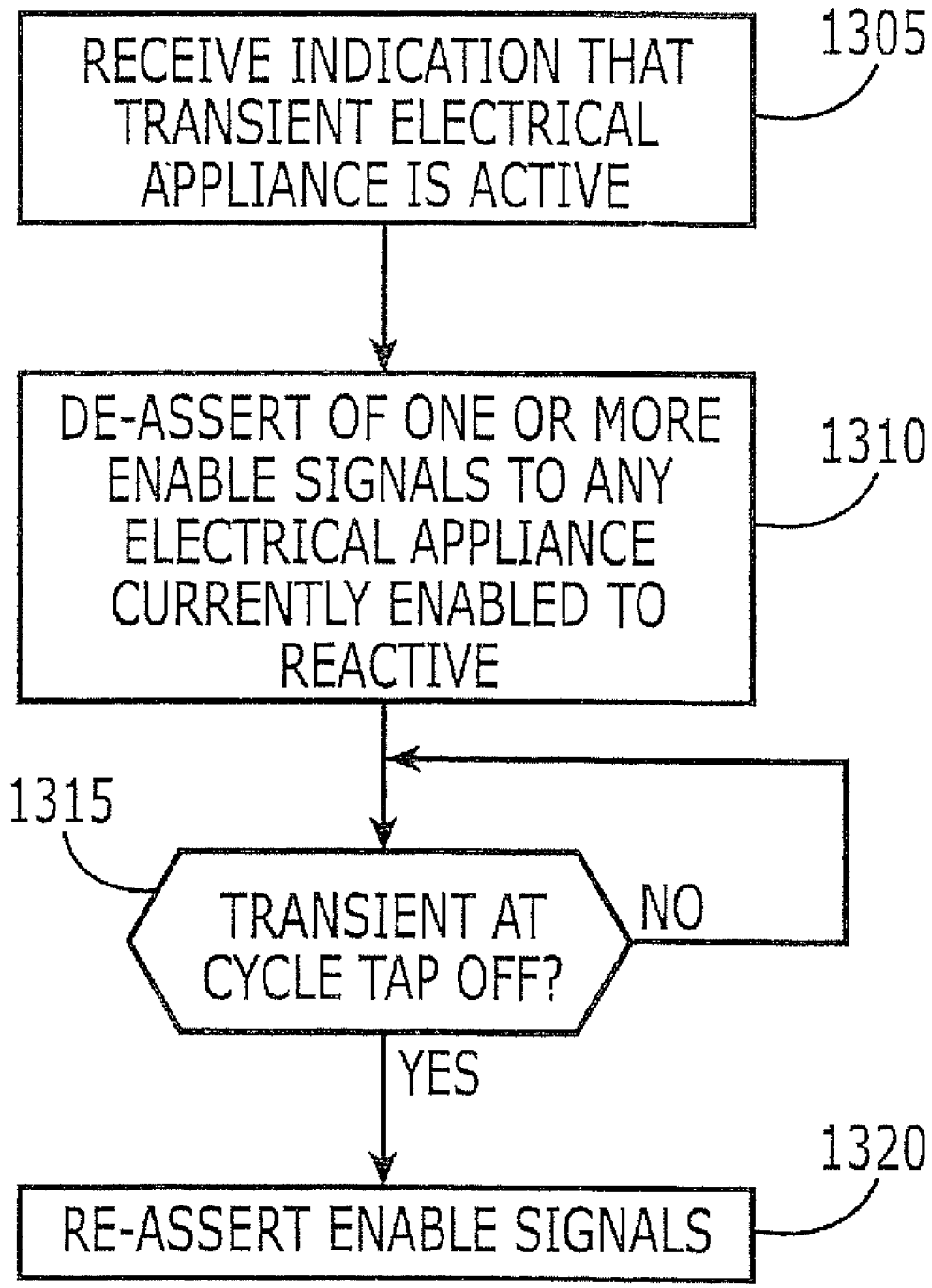
FIG. 13 is a flowchart that illustrates operations of local and remote systems responsive to indications that a transient electrical appliance has been activated in some embodiments according to the invention.

FIG. 13 is a flow chart that illustrates operations of local and remote systems in response to receipt of indications that transient electrical appliances are active in some embodiments according to the invention. It will be understood that these operations can be utilized in conjunction with any of the embodiments described herein to provide support for the handling of the operation of transient electrical appliances. According to FIG. 13, an indication is received at the processor circuit 200 that a transient electrical appliance (such as an electric range, an electric oven, electric clothes dryer, or the like) has become active (Block 1305). In response, the processor circuit 200 transmits a request message 300 to the demand management server indicating that the transient electrical appliance has been activated.

In response, the demand management server determines if any other electrical appliance is currently enabled for activation at the single customer location. If any other electrical appliances are currently enabled for activation, the demand management server transmits a response message 305 indicating that all switched electrical appliances that are currently active should be disabled by de-asserting the enablement signal 310 thereto (Block 1310), The processor circuit 200 continues to monitor the indication from the transient electrical appliances and can periodically transmit corresponding request messages 300 to the demand management server indicating the same.

Once the transient electrical appliances switches off, such as after reaching its preheat temperature or the temperature at which it will begin to cycle subsequently, (Block 1315) the processor circuit 200 transmits a request message 300 to the demand management server indicating that the transient electrical appliance has switched off Accordingly, the remote system 105 then transmits a response message 305 indicating that the previously disabled electrical appliances can be re-enabled through assertion of the enablement signal 310 (Block 320).

Figure 14:
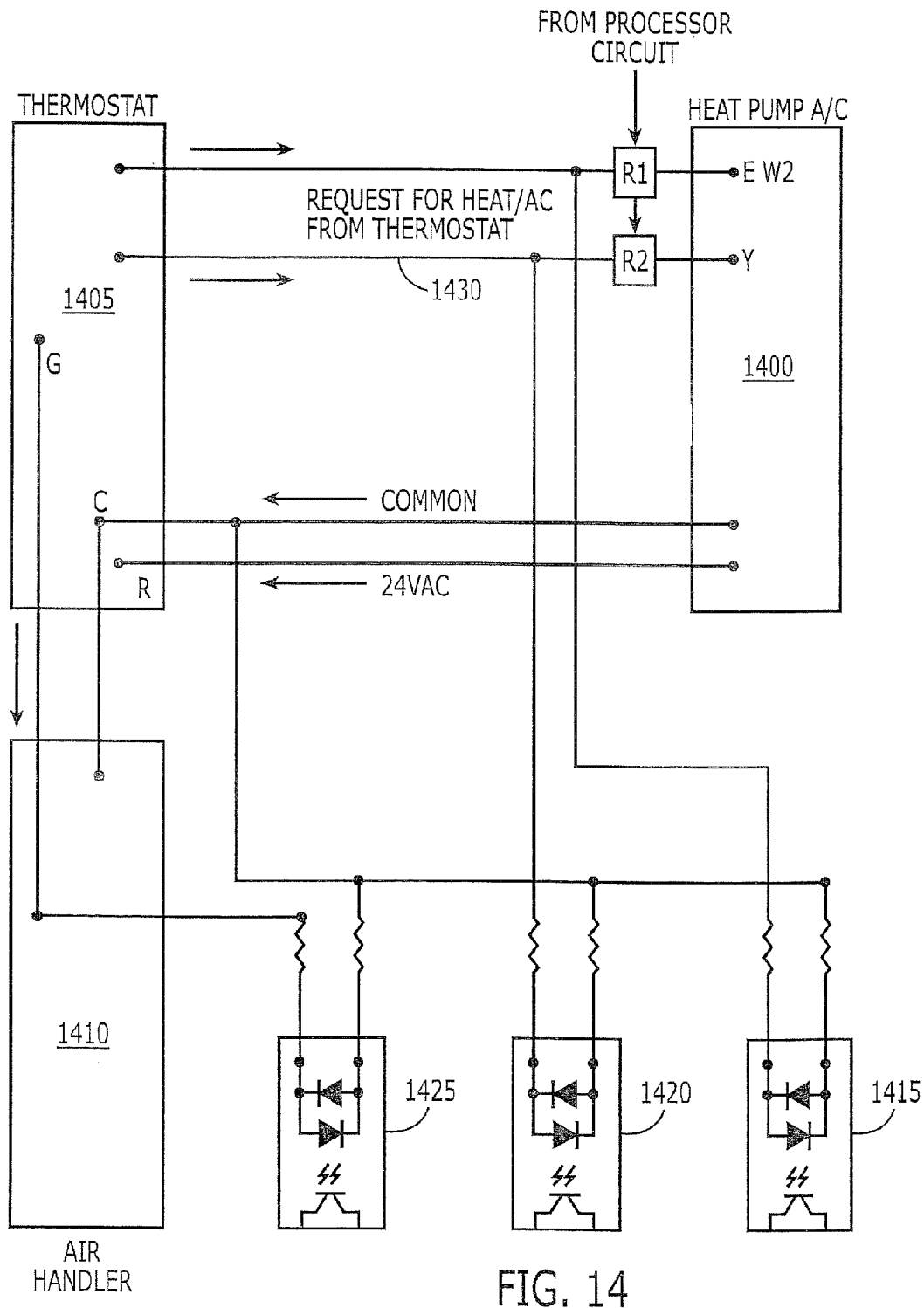
FIG. 14 is a schematic diagram that illustrates circuits and methods used for sensing activation/deactivation of, for example, heat pumps/air-conditioners in some embodiments according to the invention.

FIG. 14 is a schematic diagram that illustrates methods, circuits, and systems for sensing operations of electrical appliances in some embodiments according to the invention. According to FIG. 14, a thermostat 1405 is configured to operate an electrical appliance 1400 (such as a heat pump or air-conditioner) in conjunction with in an air handler or blower 1410. Opto-couplers 1415, 1420, and 1425 are electrically coupled to the thermostat 1405, electrical appliance 1400, and the air handler 1410 for sensing the operations thereof and reporting to the processor circuit.

As further shown in FIG. 14, the electrical appliance 1400 provides 24 Volt AC signal and a common reference voltage to the thermostat 1405 at terminals R and C respectively. It will be understood that the thermostat 1405 can use the common reference voltage and 24 Volt AC signal for operational power. Furthermore, the thermostat 1405 can provide 24 V AC power to the air handler 1410 (via terminal G) for operation in conjunction with the electrical appliance 1400. For example, the thermostat 1405 can enable the electrical appliance 1400 along with the air handler 1410 so that heated or conditioned air provided by the electrical appliance 1400 can be circulated throughout the living space by the air handler 1410.

The thermostat 1405 can also provide requests to the relays R1 and the R2 which, in-turn, can provide for the activation/deactivation of the electrical appliance 1400 in response to respective enablement signals provided by the processor circuit as described above. For example, the thermostat 1405 can provide a Request for Heat/Air Conditioning 1430 to R2, which can be coupled to the electrical appliance 1400 in response to an enablement signal from the processor circuit (not shown).

In operation, the opto-couplers 1415, 1420, and 1425 are each configured to sense different operations provided by the structure shown in FIG. 14. In particular, when the Request for Heating/Air Conditioning 1430 is provided by the thermostat 1405, the voltage is provided the relay R2 and to one of the terminals of the opto-coupler 1420. Therefore, the terminals of the opto-coupler 1420 are biased by the Request for Heat/Air Conditioning 1430 and the common reference voltage provided by the electrical appliance 1400. In response, the opto-coupler 1420 can provide an indication to the processor circuit that the thermostat 1405 is requesting heating or cooling from the electrical appliance 1400.

The opto-couplers 1415 is configured to sense a voltage difference across the Request for Emergency Heat/Air Conditioning provided by the thermostat 1405 and the common reference voltage. Accordingly, when the thermostat 1405 provides the Request for Emergency Heating/Air Conditioning, the opto-coupler output indicates to the processor circuit that the thermostat 1405 is requesting Emergency Heating/Air Conditioning.

Still referring to FIG. 14, the opto-coupler 1425 can sense the activation of the air handler 1410 in response to the voltage provided thereto by the thermostat 1405. Accordingly, when the thermostat 1405 enables the air handler 1410, the terminals of the opto-coupler 1425 are biased across the 24 V AC signal (provided to the air handler 1410) and the common reference voltage (provided by the heat pump 1400). In response, the processor circuit can received the output of the opto-coupler 1425 to indicate operation of the air handler 1410.

Figure 15:
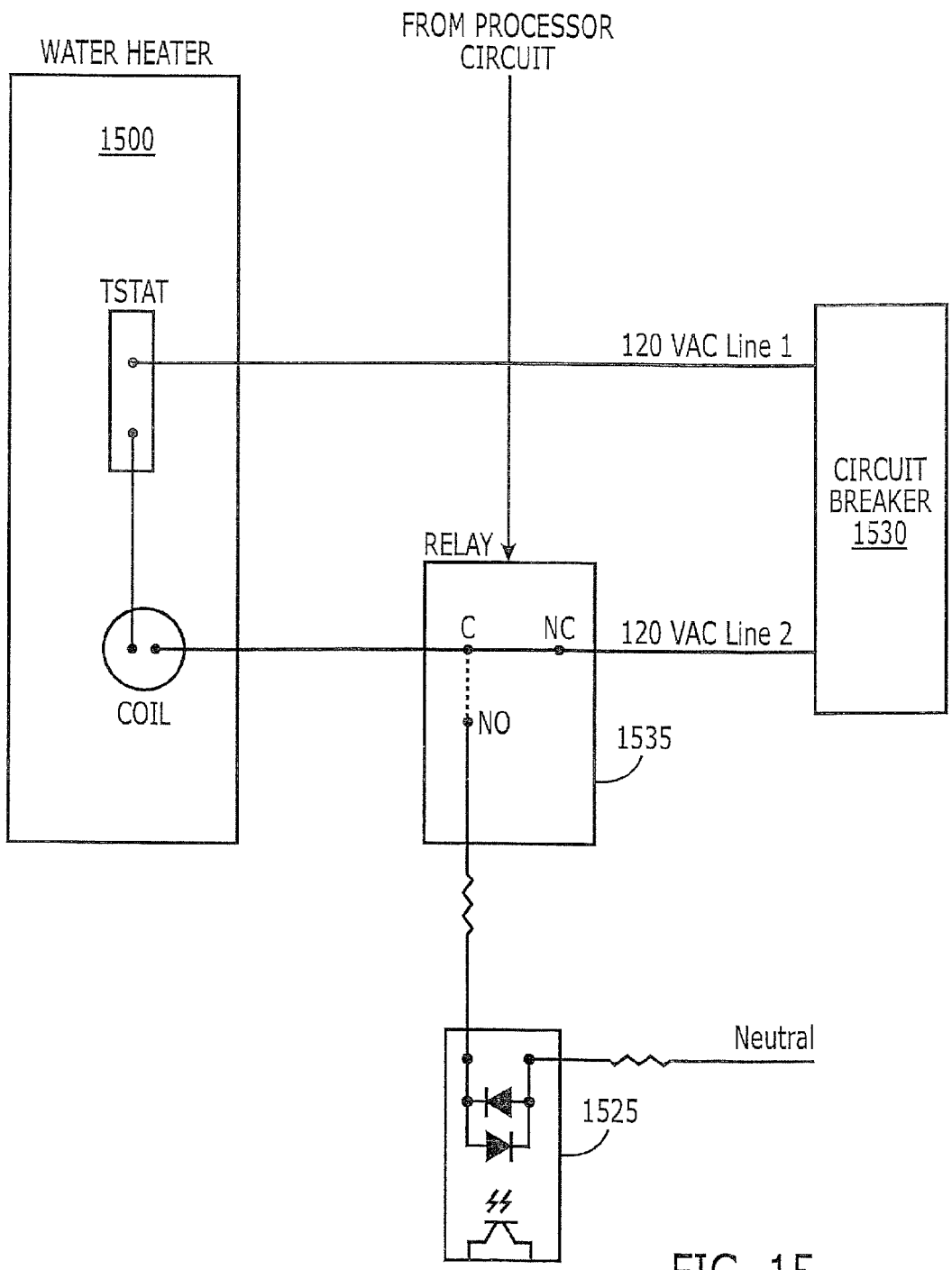
FIG. 15 is a schematic diagram that illustrates circuits and methods used for sensing activation/deactivation of, for example, water heaters in some embodiments according to the invention.

FIG. 15 is a schematic diagram that illustrates methods, circuits, and systems used to sense the operations of water heaters in some embodiments according to the invention. According to FIG. 15, a water heater 1500 can be coupled to a pair of 120 V AC lines via a relay 1535. Specifically, the water heater 1500 includes a heating element used to heat water stored in a tank, according to a water heater thermostat setting.

The relay 1535 is coupled to an enablement signal provided by the processor circuit as described above. In normal operation, the enablement signal is disabled so that the relay 1535 couples one of the 120 V AC lines from a circuit breaker 1530 to a terminal of the heating coil. Accordingly, when the relay 1535 is in this configuration, the water heater 1500 can heat water to a temperature setting indicated by the thermostat. However, when the enablement signal from the processor circuit is enabled, the relay 1535 decouples the terminal of the heating coil from the 120 V AC line provided via the relay 1535. Accordingly, in this configuration, the water heater 1500 is not able to heat water as the second 120 V AC line is decoupled from the heating coil.

When the relay 1535 decouples the 120 V AC line from the heating coil, the terminal of the heating coil is instead coupled to a first terminal of an opto-coupler 1525. A second terminal of the opto-coupler 1525 is connected to a reference voltage so that the terminals of the opto-coupler 1525 can be biased to indicate to the processor circuit whether the water heater 1500 is requesting heat. In particular, when the water heater thermostat is closed, the water heater 1500 is requesting water to the heated. Accordingly, the 120 V AC line coupled directly to one of the terminals of the thermostat can be sensed at the terminal of the opto-coupler 1525. Accordingly, the output of the opto-coupler 1525 provided to the processor circuit can indicate that the water heater 1500 is requesting heating. Furthermore, when the thermostat is open, the 120 V AC signal provided at the other terminal the thermostat is not provided to the first terminal of the opto-coupler 1525, thereby indicating to the processor circuit that the water heater 1500 is not requesting heating.

Figure 16:
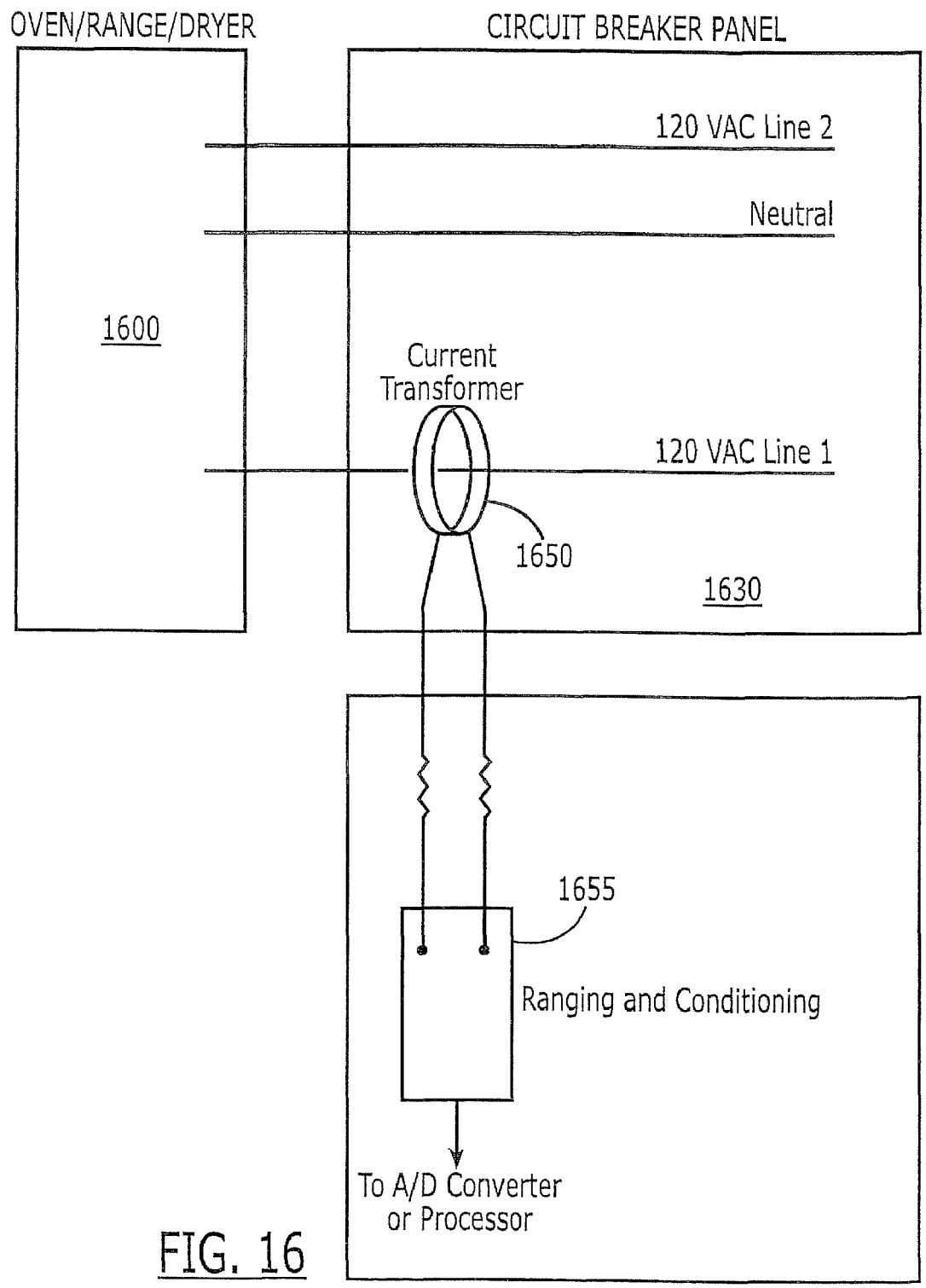
FIG. 16 is a schematic diagram that illustrates circuits and methods for sensing activation/deactivation of, for example, ovens/ranges/dryers in some embodiments according to the invention.

FIG. 16 is a schematic diagram that illustrates methods, circuits, and systems for sensing the operation of electrical appliances in some embodiments according to the invention. According to FIG. 16, an electrical appliance 1600 can be, for example, an electric oven, electric range top, electric dryer, or another type of electrical appliance, which may be unswitched. The electrical appliance 1600 is provided with power via first and second 120 V AC lines and a reference or neutral line from a circuit breaker panel 1630. A current transformer 1650 may be placed in close proximity to the circuit breaker panel 1630 and positioned to sense current flow in one of the 120 V AC lines.

Accordingly, when the electrical appliance 1600 is in operation, the current transformer 1650 can provide a voltage across terminals of a ranging and conditioning circuit 1655, which can provide an output to an analog to digital converter circuit and subsequently to the processor circuit to indicate operation of the electrical appliance 1600. It will be understood that the ranging and conditioning circuit 1655 can operate to change the nature of the voltage signals (e.g., from AC to DC), as well as scale the voltage levels to the appropriate thresholds for the processor circuit, the analog to digital converter circuit, or other circuit which interfaces to the ranging and conditioning circuit 1655.

Operation of the ranging and conditioning circuit 1655 can vary based on which type of electrical appliance 1600 is being monitored. For example, if the electrical appliance 1600 is an electric range top, the ranging and conditioning circuit 1655 may indicate different levels of operation of the electric range top 1600 which may be output as different voltage levels indicating different degrees of operation. For example, a first value provided by the ranging and conditioning circuit 1655 can indicate that only a single burner of the electric range top is activated. In other embodiments according to the invention, other digital outputs can indicate that 2, 3, or more burners of the electric range top are activated. Accordingly, the processor circuit can deter mine whether to enable/disable other electrical appliances based on the sensed operation of the electric range top.

In still further embodiments according to the invention, if the electrical appliance 1600 is an electric dryer, a relay can be electrically coupled to the dryer's heating element so that the processor circuit can take partial control of the electric dryer if desired. For example, if the processor circuit determines that the demand should be reduced, one option would be to temporarily disable or, alternatively, duty cycle the dryer's heating element to reduce peak demand As described above, significant reductions in demand during these time intervals may be achieved by reducing the overlapping activation time of different electrical appliances that are located at a single customer location. For example, in some embodiments according to the invention, two electrical appliances (such as two different heat pumps at a single customer location) can be controlled so that the activation of each of the respective heat pumps is shifted with respect to one another. Accordingly, time shifting the activation of the different heat pumps can reduce the likelihood that both heat pumps are active during the same on-peak time intervals, where the electrical service provider measures the maximum demand for electrical service for the purposes of billing.

These approaches may provide both a cost reduction for the customer as well as the benefit to the electrical service provider by allowing a further reduction in the peak demand capacity required for the grid. In particular, the electrical service provider may further reduce the peak capacity of their power generation as both heat pumps are less likely to be activated at the same time (during peak demand).

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A method of reducing peak electrical demand at a single customer location of an electrical service provider during at least one time interval during a day, the method comprising:
  shifting the activation of a first electrical appliance located at the single customer location from the at least one time interval during a day to a second time interval during which a second electrical appliance is not activated for at least part of the second time interval;
  wherein said shifting comprises operations performed using a programmed computer processor circuit.

2. The method of claim 1, wherein shifting the activation of the first electrical appliance is based on a determination of the effects of the simultaneous activation of the first and second electrical appliances; and wherein shifting the activation of the first electrical appliance is further based on a determination of the effects of the subsequent deactivation of the first and second electrical appliances.

3. The method of claim 1, wherein shifting the activation of the first electrical appliance is determined by a demand management server remote from the single customer location and communicatively coupled, via a network, with the single customer location.

4. The method of claim 3, the method further comprising:
providing a user interface at the single customer location to the demand management server; and
providing input to the demand management server via the user interface;
wherein the input comprises user preferences used by the demand management server to customize the shifting of the activation of the first electrical appliance.

5. The method of claim 4, wherein the input further comprises a comfort level specified for the single customer location indicating the user's desired level of environmental comfort at the single customer location; and wherein the specified comfort level corresponds to the degree of overlapping activation time of the first and second electrical appliances allowed by the demand management server.

6. The method of claim 3, wherein shifting the activation of the first electrical appliance further comprises:
determining a first priority associated with activation of the first electrical appliance;
determining a second priority associated with activation of the second electrical appliance; and
shifting the activation of the first electrical appliance based on a comparison of the first priority and the second priority, such that the appliance with the lower priority is not activated until the appliance with the higher priority is not active.

7. The method of claim 1, wherein the first electrical appliance comprises a water heater.

* * * * *

UNITED STATES PATENT AND TRADEMARK OFFICE
CERTIFICATE OF CORRECTION

PATENT NO. : 7,962,248 B2  
APPLICATION NO. : 12/692991  
DATED : June 14, 2011  
INVENTOR(S) : Flohr Page 1 of 1

It is certified that error appears in the above-identified patent and that said Letters Patent is hereby corrected as shown below:

In the Patent:

Column 21, Line 4: Please begin a new paragraph at "Moreover"

Column 24, Line 9: Please correct "can deter mine whether" to read -- can determine whether --

Signed and Sealed this
Twenty-fifth Day of October, 2011

David J. Kappos
*Director of the United States Patent and Trademark Office*